(12) United States Patent
Leontaris et al.

(10) Patent No.: US 9,438,881 B2
(45) Date of Patent: Sep. 6, 2016

(54) ENHANCEMENT METHODS FOR SAMPLED AND MULTIPLEXED IMAGE AND VIDEO DATA

(75) Inventors: Athanasios Leontaris, Mountain View, CA (US); Alexandros Tourapis, Milpitas, CA (US); Peshala V. Pahalawatta, Glendale, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 530 days.

(21) Appl. No.: 13/811,255

(22) PCT Filed: Jul. 19, 2011

(86) PCT No.: PCT/US2011/044556
§ 371 (c)(1),
(2), (4) Date: Jan. 18, 2013

(87) PCT Pub. No.: WO2012/012444
PCT Pub. Date: Jan. 26, 2012

(65) Prior Publication Data
US 2013/0113884 A1    May 9, 2013

Related U.S. Application Data

(60) Provisional application No. 61/365,743, filed on Jul. 19, 2010.

(51) Int. Cl.
*H04N 13/00*      (2006.01)
*H04N 19/597*   (2014.01)
*H04N 19/61*     (2014.01)
(Continued)

(52) U.S. Cl.
CPC ...... *H04N 13/0048* (2013.01); *H04N 13/0029* (2013.01); *H04N 19/186* (2014.11); *H04N 19/187* (2014.11); *H04N 19/33* (2014.11); *H04N 19/48* (2014.11); *H04N 19/597* (2014.11);
(Continued)

(58) Field of Classification Search
CPC ............... H04N 13/0029; H04N 13/0048; H04N 19/597; H04N 19/61; H04N 19/186; H04N 19/86; H04N 19/48; H04N 19/82; H04N 19/33; H04N 19/85; H04N 19/187
See application file for complete search history.

(56) References Cited

U.S. PATENT DOCUMENTS 4,985,767 A    1/1991    Haghiri
5,159,453 A    10/1992   Dhein
(Continued)

FOREIGN PATENT DOCUMENTS

EP    0477822    4/1992
EP    1507415    2/2005
(Continued)

OTHER PUBLICATIONS

D.C Hutchison, "Introducing DLP 3-D TV".
(Continued)

*Primary Examiner* — Jeffrey Harold
*Assistant Examiner* — Sean Haiem

(57) ABSTRACT

Enhancement methods for sampled and multiplexed image and video data are described. Each component picture is separately processed either after de-multiplexing or on the fly. Processing and de-multiplexing can be combined in a single joint step. The methods apply to both encoding and decoding system and include applications to scalable video coding systems.

23 Claims, 42 Drawing Sheets

Full Resolution Image

Vertically Sampled Image

(51) Int. Cl.
*H04N 19/186* (2014.01)
*H04N 19/86* (2014.01)
*H04N 19/48* (2014.01)
*H04N 19/82* (2014.01)
*H04N 19/33* (2014.01)
*H04N 19/85* (2014.01)
*H04N 19/187* (2014.01)

(52) U.S. Cl.
CPC .............. *H04N19/61* (2014.11); *H04N 19/82* (2014.11); *H04N 19/85* (2014.11); *H04N 19/86* (2014.11)

(56) References Cited

U.S. PATENT DOCUMENTS

| | | | | |
|---|---|---|---|---|
| 5,847,711 | A * | 12/1998 | Kaufman et al. | 345/424 |
| 6,259,825 | B1 | 7/2001 | Yamazaki | |
| 8,023,561 | B1 * | 9/2011 | Garrido et al. | 375/240.15 |
| 2005/0117637 | A1 | 6/2005 | Routhier | |
| 2005/0185712 | A1 | 8/2005 | Lee | |
| 2007/0064800 | A1 | 3/2007 | Ha | |
| 2008/0159404 | A1 | 7/2008 | Hong | |
| 2009/0097549 | A1 | 4/2009 | Kim | |
| 2009/0322941 | A1 | 12/2009 | Hatanaka | |
| 2010/0128803 | A1 * | 5/2010 | Divorra Escoda et al. | 375/240.29 |
| 2010/0284466 | A1 * | 11/2010 | Pandit et al. | 375/240.16 |
| 2011/0135005 | A1 * | 6/2011 | Tourapis et al. | 375/240.16 |
| 2011/0170792 | A1 | 7/2011 | Tourapis | |
| 2011/0280300 | A1 * | 11/2011 | Tourapis et al. | 375/240.2 |
| 2012/0026288 | A1 * | 2/2012 | Tourapis et al. | 348/43 |

FOREIGN PATENT DOCUMENTS

| | | |
|---|---|---|
| GB | 2455979 | 7/2009 |
| WO | 97/43863 | 11/1997 |
| WO | 2008/153856 | 12/2008 |
| WO | 2009/051690 | 4/2009 |
| WO | 2009/091521 | 7/2009 |
| WO | 2010/011557 | 1/2010 |
| WO | 2010/039417 | 4/2010 |
| WO | 2010/075346 | 7/2010 |
| WO | 2010/088420 | 8/2010 |
| WO | 2010/123909 | 10/2010 |

OTHER PUBLICATIONS

McCormick, M.D. et al. "Implementation of Stereoscopic and Dual View Images on a Microdisplay High Definition Television" 3DTV-CON May 2008, Istanbul, Turkey, pp. 33-36.
H.264, "Advanced Video Coding for Generic Audiovisual Services" Mar. 2003.
SMPTE 421M, VC-1 Compressed Video Bitstream Format and Decoding Process, Apr. 2006.
Suehring, JVT Reference Software version JM15.1.
Guleryuz, O.G. "A Nonlinear Loop Filter for Quantization Noise Removal in Hybrid Video Compression" in Proc. Intl Conference on Image Processing, vol. 2, pp. 333-336, Sep. 2005.
Guleryuz, O.G. "Iterated Denoising for Image Recovery" in Proc. Data Compression Conference, Snowbird, UT, Apr. 2002.
Chi-Man Lee et al. "A Novel Interpolation Scheme for Quincunx-Subsampled Images" IEEE Circuits and Systems, IEEE, Orlando, FL, vol. 4, May 30, 1999, pp. 147-150 Section 3.
Ying Chen, et al. "Adaptive Filter for Spatial Scalability Video Coding" Picture Coding Symposium, Apr. 24-26, 2006, Beijing, Sections 1-3.
Scotton P. et al. "A Low Complexity Video Subband Coder for ATM" Signal Processing Image Communication, Elsevier Science PUblishers, Amsterdam, NL, vol. 6, No. 5, Oct. 1, 1994, pp. 421-433.
Pei-Yin Chen, "VLSI Implementation for One-Dimensional Multi-level Lifting Based Wavelet Transform" IEEE Transactions on Computers, IEEE Service Center, Los Alamitos, CA, US, vol. 53, No. 4, Apr. 1, 2004, pp. 386-398.
Gangwal O P et al. "Understanding Video Pixel Processing Applications for Flexible Implementations", Digital System Design, 2003 Proc. Euromicro Symposium on Sep. 1-6, 2003, Piscataway, NJ.
PCT International Search Report mailed on May 7, 2012 for International Application PCT/US2011/044556 filed on Jul. 19, 2011 in the name of Dolby Laboratories Licensing Corporation.
PCT Written Opinion mailed on May 7, 2012 for International Application PCT/US2011/044556 filed on Jul. 19, 2011 in the name of Dolby Laboratories Licensing Corporation.
PCT International Preliminary Report on Patentability completed Dec. 18, 2012 for International Application PCT/US2011/044556 filed on Jul. 19, 2011 in the name of Dolby Laboratories Licensing Corporation.

\* cited by examiner

| $p_{00}$ | $p_{01}$ | $p_{02}$ | $p_{03}$ | $p_{04}$ | $p_{05}$ | $p_{06}$ | $p_{07}$ |
|---|---|---|---|---|---|---|---|
| $p_{10}$ | $p_{11}$ | $p_{12}$ | $p_{13}$ | $p_{14}$ | $p_{15}$ | $p_{16}$ | $p_{17}$ |
| $p_{20}$ | $p_{21}$ | $p_{22}$ | $p_{23}$ | $p_{24}$ | $p_{25}$ | $p_{26}$ | $p_{27}$ |
| $p_{30}$ | $p_{31}$ | $p_{32}$ | $p_{33}$ | $p_{34}$ | $p_{35}$ | $p_{36}$ | $p_{37}$ |
| $p_{40}$ | $p_{41}$ | $p_{42}$ | $p_{43}$ | $p_{44}$ | $p_{45}$ | $p_{46}$ | $p_{47}$ |
| $p_{50}$ | $p_{51}$ | $p_{52}$ | $p_{53}$ | $p_{54}$ | $p_{55}$ | $p_{56}$ | $p_{57}$ |
| $p_{60}$ | $p_{61}$ | $p_{62}$ | $p_{63}$ | $p_{64}$ | $p_{65}$ | $p_{66}$ | $p_{67}$ |
| $p_{70}$ | $p_{71}$ | $p_{72}$ | $p_{73}$ | $p_{74}$ | $p_{75}$ | $p_{76}$ | $p_{77}$ |
|  |  |  |  |  |  |  | $p_{87}$ |

Vertical block edge

ENHANCEMENT METHODS FOR SAMPLED AND MULTIPLEXED IMAGE AND VIDEO DATA

CROSS-REFERENCE TO RELATED APPLICATIONS

The present application claims benefit to U.S. Provisional Patent Application No. 61/365,743 filed on Jul. 19, 2010, here incorporated by reference in its entirety.

TECHNOLOGY

The present disclosure relates generally to methods and systems for processing image and video data. More particularly, an embodiment of the present invention relates to enhancement methods for sampled and multiplexed image and video data.

BACKGROUND

Images and multi-dimensional data are usually sampled in a rectangular raster-scan pattern. Throughout the present specification, a person having ordinary skill in the art would understand that the term "sampling" may refer to downsampling or upsampling. Downsampling an image or a video frame reduces the resolution or pixel numbers of the image or video frame. On the other hand, upsampling an image or a video frame increases the resolution or pixel numbers of the image. Sampling may involve a process where all or partial samples are selected with or without any filtering. Sampling may be performed according to different sampling spacing or ratios, linear functions, or nonlinear functions. In addition, a person ordinarily skilled in the art would understand that the term "re-sampling" may refer to restoring an sampled image or video frame back to its previous state before being sampled.

Reasons for sampling image or video data are many. They include and are not limited to: (a) Easier storage since the number of samples is now smaller. (b) Smaller computational burden, since it is e.g. faster to compute a Fourier transform or perform motion estimation and compensation over e.g. a quarter of the original data compared to the original sample size. (c) Properly done sampling (e.g. preceded by low-pass filtering) may also increase the compression ratio of the data (disregarding the fact that the sample size is also smaller). (d) Sampling can help in terms of representing and categorizing the data with respect to e.g. pattern recognition or matching. Careful sampling can identify those samples that are the most critical in the representation of the image or video data. Not only is the computational burden lessened but even the success ratio of certain algorithms can benefit greatly because of sampling. (e) One may want to sample the data in such a pattern that it becomes easier to retrieve later the missing/discarded samples.

BRIEF DESCRIPTION OF THE DRAWINGS

The accompanying drawings, which are incorporated into and constitute a part of this specification, illustrate one or more embodiments of the present disclosure and, together with the description of example embodiments, serve to explain the principles and implementations of the disclosure.

FIG. 23 shows an example of diagonal deblocking.

FIG. 24 shows joint deblocking and de-multiplexing for interpolation using a bi-linear filter.

DESCRIPTION OF EXAMPLE EMBODIMENTS

Figure 1:
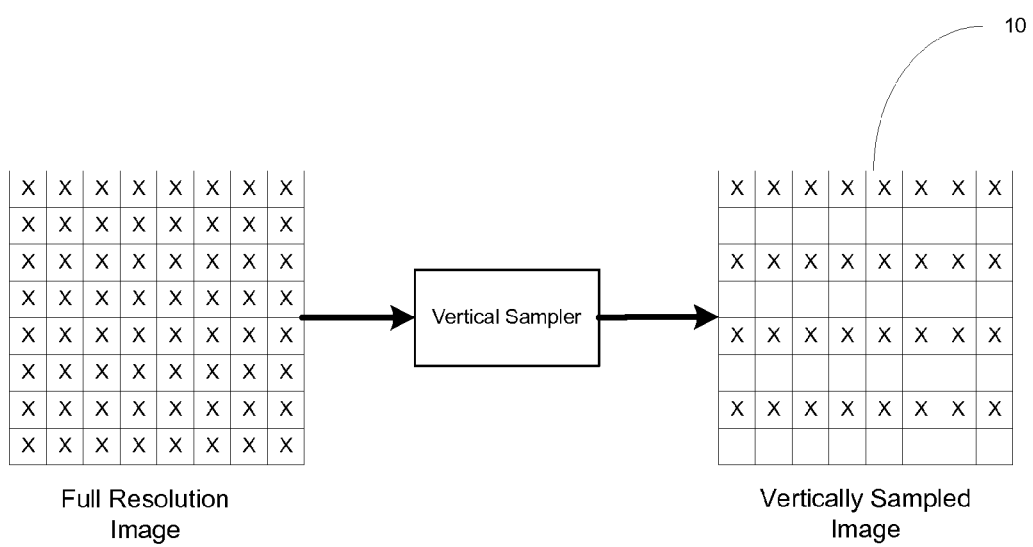
FIG. 1 shows a sampling pattern where sub-sampling is performed by a ratio of 2 in the vertical dimension.

The present disclosure relates to enhancement methods for sampled and multiplexed image and video data.

According to a first aspect, a method to process composite sampled image or video data comprising multiplexed image or video data pertaining to a plurality of image or video components is provided, comprising: de-multiplexing the composite sampled image or video data into a plurality of component pictures; separately processing each component picture; and sampling and multiplexing the separately processed component pictures together.

According to a second aspect, a method to process composite sampled image or video data comprising multiplexed image or video data pertaining to a plurality of image or video components or categories is provided, comprising: processing each element of the composite sampled image or video data by taking into account the image or video component or category to which said each element pertains, thus differentiating between processing of composite data pertaining to one image or video component or category and processing of composite data pertaining to another image or video component or category.

According to a third aspect, a method to process composite sampled image or video data comprising multiplexed image or video data pertaining to a plurality of image or video components is provided, comprising: de-multiplexing the composite sampled image or video data into a plurality of component pictures while at the same time processing the sampled image or video data, wherein processing is selected from deblocking, denoising, deblurring, deringing, and filtering.

According to a fourth aspect, a method to process composite sampled image or video data comprising multiplexed image or video data pertaining to a plurality of image or video categories is provided, comprising: providing an initial block of existing samples of the same category; applying a transform to the samples of the initial block; using transform coefficients of the initial block to estimate transform coefficients of a double-sized block containing the same existing samples of the initial block and missing samples of the same category of the existing samples; adjusting the estimated transform coefficients of the other double-sized block; and applying an inverse transform to the samples of the double-sized block.

According to a fifth aspect, a method to process image or video data is provided, comprising: separately pre-processing image or video components of an image or video to be interleaved or multiplexed; separately sampling the pre-processed image or video components; interleaving or multiplexing the sampled pre-processed image or video components, thus forming a composite image or video; and processing the composite image or video.

According to a sixth aspect, a method to process composite sampled image or video data of a scalable video coding system having a base layer and one or more enhancement layers is provided, the composite sampled image or video data comprising multiplexed image or video data pertaining to a plurality of image or video components, the method comprising: de-multiplexing the composite sampled image or video data of one or more of the one or more enhancement layers into a plurality of enhancement layer component pictures; replacing missing samples of each enhancement layer component picture with samples from the base layer; separately processing each enhancement layer component picture after replacement; and sampling and multiplexing the separately processed enhancement layer component pictures together.

According to a seventh aspect, a method to process composite sampled image or video data of a scalable video coding system having a base layer and one or more enhancement layers is provided, the composite sampled image or video data comprising multiplexed image or video data pertaining to a plurality of image or video components, the method comprising: de-multiplexing the composite sampled image or video data of one or more of the one or more enhancement layers into a plurality of enhancement layer component pictures; separately coding each enhancement layer component picture using a prediction from the base layer; separately processing each coded enhancement layer component picture; and sampling and multiplexing the separately processed component pictures together.

According to an eighth aspect, a method for processing video samples of an image is provided, comprising: performing two separate sets of operations on the video samples, the first set of operations comprising upsampling the video samples followed by processing the upsampled video samples to provide a first output, and the second set of operations comprising processing the video samples followed by upsampling the processed video samples to provide a second output; and combining the first output with the second output.

According to a ninth aspect, a method to increase computational speed of a processing operation on samples of a composite image or video arrangement is provided, comprising: de-multiplexing the samples of the composite image or video arrangement into separate samples of components forming the composite image or video arrangement; separately processing each component; and multiplexing the separately processed components together.

Images and multi-dimensional data are usually sampled in a rectangular raster-scan pattern. Throughout the present specification, a person having ordinary skill in the art would understand that the term "sampling" may refer to downsampling or upsampling. Downsampling an image or a video frame reduces the resolution or pixel numbers of the image or video frame. On the other hand, upsampling an image or a video frame increases the resolution or pixel numbers of the image. Sampling may involve a process where all or partial samples are selected with or without any filtering. Sampling may be performed according to different sampling spacing or ratios, linear functions, or nonlinear functions. In addition, a person ordinarily skilled in the art would understand that the term "re-sampling" may refer to restoring an sampled image or video frame back to its previous state before being sampled.

Reasons for sampling image or video data are many. They include and are not limited to: (a) Easier storage since the number of samples is now smaller. (b) Smaller computational burden, since it is e.g. faster to compute a Fourier transform or perform motion estimation and compensation over e.g. a quarter of the original data compared to the original sample size. (c) Properly done sampling (e.g. preceded by low-pass filtering) may also increase the compression ratio of the data (disregarding the fact that the sample size is also smaller). (d) Sampling can help in terms of representing and categorizing the data with respect to e.g. pattern recognition or matching. Careful sampling can identify those samples that are the most critical in the representation of the image or video data. Not only is the computational burden lessened but even the success ratio of certain algorithms can benefit greatly because of sampling. (e) One may want to sample the data in such a pattern that it becomes easier to retrieve later the missing/discarded samples.

Figure 2:
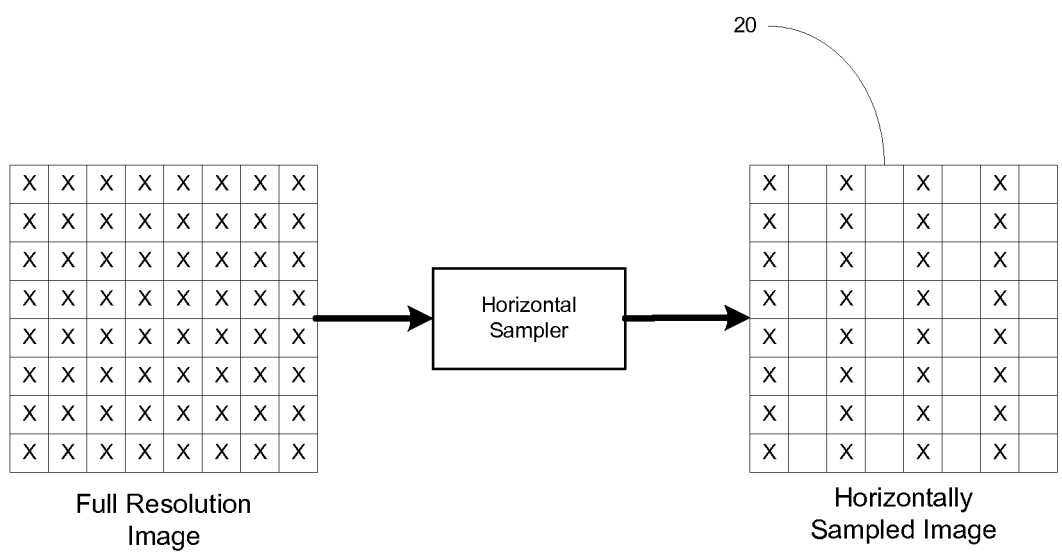
FIG. 2 shows a sampling pattern where sub-sampling is performed by a ratio of 2 in the horizontal dimension.
Figure 3:
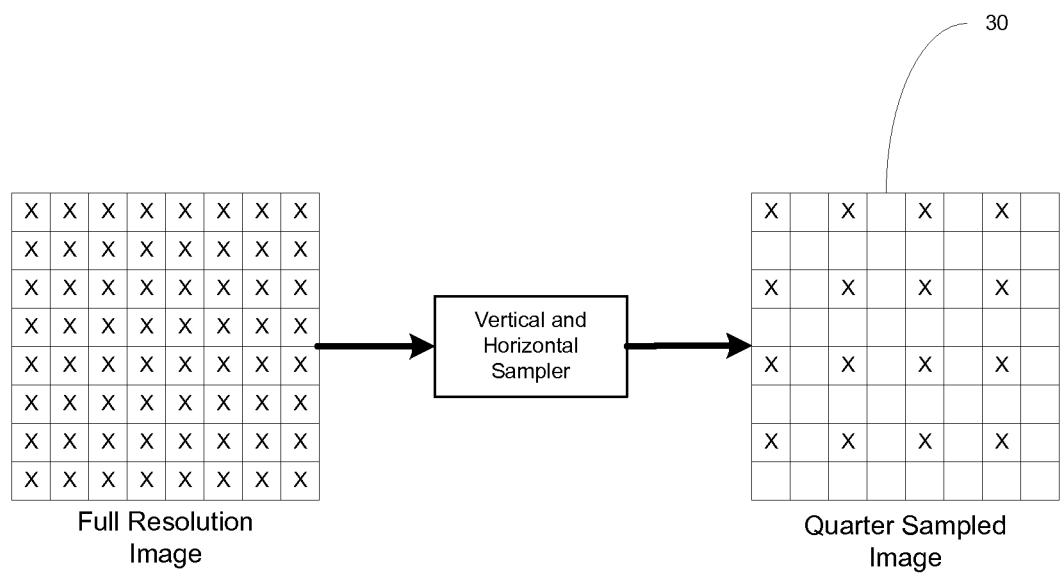
FIG. 3 shows a sampling pattern where sub-sampling is performed by a ratio of 2 in both dimensions.

A majority of signal processing algorithms, which include denoising, deblocking, and enhancement filtering operate on regular raster-scanned grids. Some examples of sampling arrangements will be briefly described. In a rectangular raster-scanned grid one may wish to keep all pixels horizontally and one out of two pixels vertically. If one dimension is deemed more important than the rest, the sampling ratio may be lowered in order to retain more of the original information. Such a sampling pattern (10) is shown in FIG. 1. In a different application, horizontal instead of vertical sampling may be preferred (FIG. 2, where a horizontally sampled image (20) is shown). For many applications though, one may wish to retain equal amounts of information for both dimensions. This is possible by adopting equal sampling ratios in both dimensions as shown in FIG. 3, where a quarter sampled image (30) is shown.

Figure 4:
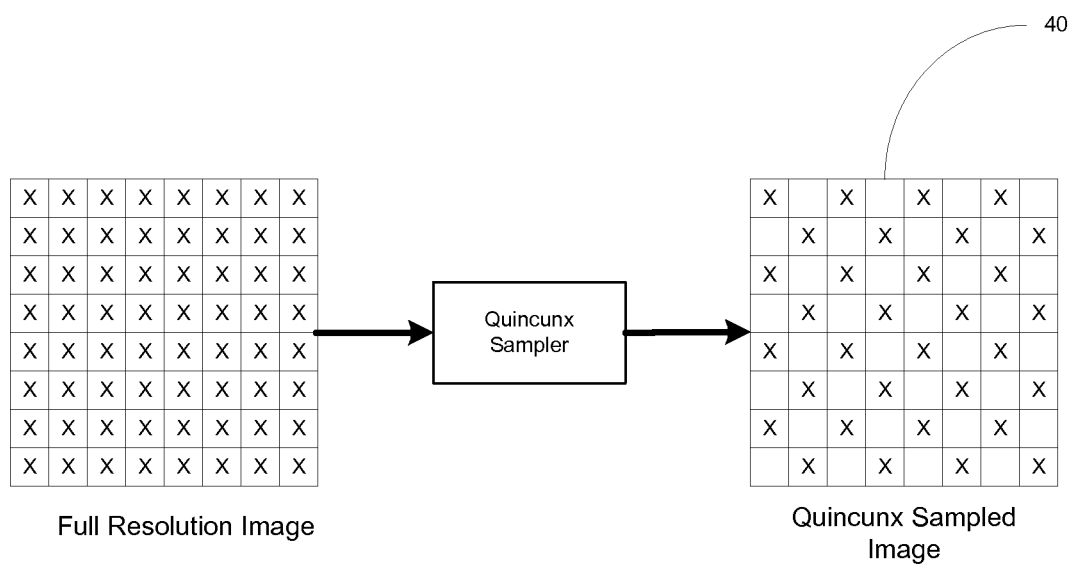
FIG. 4 shows a quincunx sampling pattern.

An alternative sampling pattern is the quincunx sampling pattern that is depicted in FIG. 4, where a quincunx sampled image (40) is shown. Each missing sample is equidistant from its closest neighboring existing samples, which may benefit interpolation of missing samples. Further improvements on the interpolation process may find support in reference [9]. In practice, the horizontal and vertical dimensions are not equal in terms of importance. One may want to retain higher resolution in the vertical rather than the horizontal dimension. While the sampling pattern of FIG. 1 retains the same number of samples as the pattern in FIG. 4, it is not as efficient for interpolation as quincunx sampling. Quincunx sampling retains a greater part of the signal characteristics and frequency information and lends itself to more efficient interpolation of the missing samples. Quincunx sampling has been used to sample left and right views (a stereo pair) of a 3D stereoscopic image sequence and package them together into a checkerboard-like (CB) arrangement. This resulting CB picture contains information from both views and is compatible with some of the currently available 3D displays and systems which are based on the Digital Light Processing (DLP) technology [see references 1, 2, incorporated herein by reference in their entirety].

Figure 5:
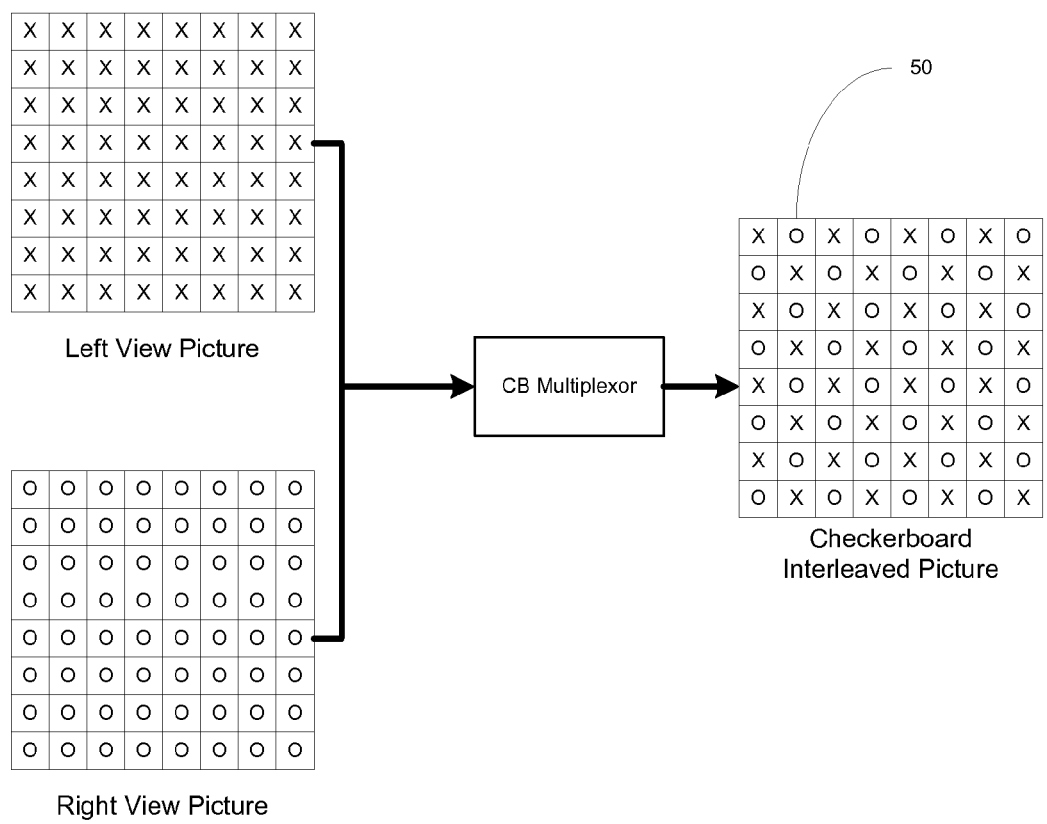
FIG. 5 shows a checkerboard interleaved arrangement for the delivery of stereoscopic material, known as CB.

Such a sampling and interleaving arrangement, also known as "CB" or "Quincunx-Quincunx", and the resulting CB picture (50) are shown in FIG. 5. "CB" entails quincunx sampling and checkerboard interleaving (the terms "interleaving" and "multiplexing" will be used interchangeably throughout the present disclosure). The delivery of the CB-formatted content to a CB-compatible display, such as DLP (digital light processing) displays, is possible today with the use, for example, of Blu-Ray Discs, which have the necessary capacity to store the compressed signal. Compression is facilitated by any of the codecs supported by the Blu-Ray specification such as the H.264/MPEG-4 AVC [see reference 4, incorporated herein by reference in its entirety] video coding standard and the SMPTE VC-1 [see reference 5, incorporated herein by reference in its entirety] coding standard. Hence, compression, delivery, playback, and display of CB-formatted content can be realized using commercially-available off-the-shelf equipment. Better compression performance is also possible by adopting methods that are suited for CB-formatted content [see reference 7, incorporated herein by reference in its entirety].

Figure 6:
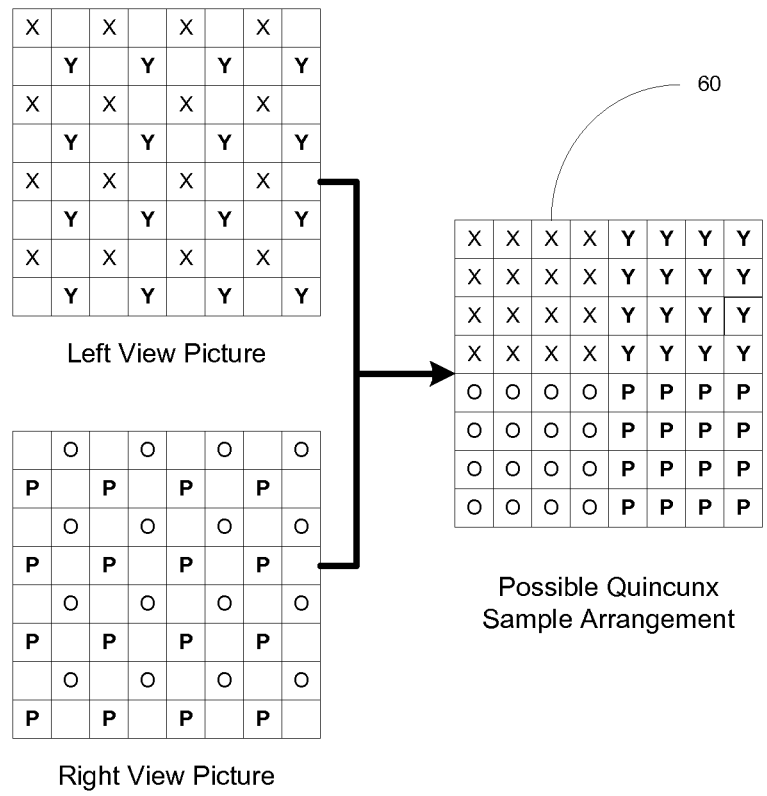
FIG. 6 shows an example of a rearrangement of quincunx samples, known as 'quadrant-quincunx' or (height/2)×(width/2) quincunx sampling pattern.

Quincunx-sampled 3D video data can be sampled and multiplexed together in several other arrangements beyond checkerboard. This includes the packed format (horizontal Side By Side-Quincunx, or vertical), and the quadrant-based method [see reference 9, incorporated herein by reference in its entirety] where each quadrant of the image represents odd or even row samples from different views. One example of the quadrant-based packing format (60) is depicted in FIG. 6. In this scenario, the quincunx-pattern samples of each view in FIG. 4 are divided into two categories and are packed together to form two sub-images. These two sub-images correspond to the same view. One contains the "even"-indexed or "top" quincunx-pattern samples, which are differentiated with dark coloring, and the other the "odd"-indexed or "bottom" samples, which adopt a light coloring. Using this format, samples in each sub-image essentially correspond to rectangular-pattern samples in the original view. This is not the only possible alternative packaging format. One could actually define the sampling pattern of FIG. 4 as the 1×1 quincunx sampling pattern, where each 2×2 set of pixels in the 3D CB picture is a collection of four sub-images. In the same way, the sampling pattern of FIG. 6 is defined as the (height/2)×(width/2) quincunx sampling pattern, which results to 4 sub-images in total. Intermediate values of N and M for the generalized (height/N)×(width/N) result to collections of N×M sub-images or equivalently (N×M)/4 groups of four sub-images. Since this arrangement involves quincunx sampling and quadrant-image-based interleaving it will be referred to henceforth as "Quadrant-Quincunx".

Figure 7:
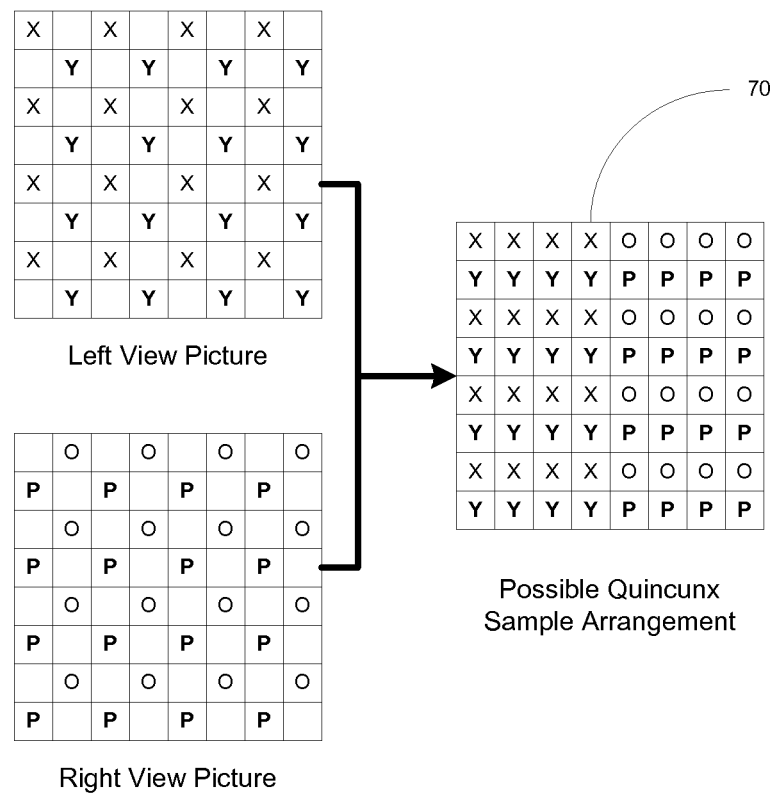
FIG. 7 shows an alternative arrangement of quincunx samples known as 'side by side-quincunx', where the views are packed side-by-side and lines of "even" quincunx samples alternate with lines of "odd" quincunx samples.

An alternative arrangement of quincunx samples is known as "Side By Side-Quincunx". Sampling is quincunx-based and interleaving is done side-by-side. For 3D stereoscopic content, the views are packed side-by-side and lines of "even" quincunx samples alternate with lines of "odd" quincunx samples. This arrangement is illustrated in FIG. 7, where a possible quincunx sample arrangement (70) is shown. Both the "Quadrant-Quincunx" and the "Side By Side-Quincunx" arrangements differ from the "CB" arrangement in that views are packed separately and are not interleaved. The "Quadrant-Quincunx" arrangement differs from the "Side By Side-Quincunx" arrangement in that all samples are aligned in the vertical direction when considered in the full resolution grid. In contrast, samples in the "Side By Side-Quincunx" arrangement are vertically aligned only every other line. Adjacent samples in the vertical direction are horizontally offset by one pixel and are therefore slightly (but intentionally) misaligned.

Figure 8:
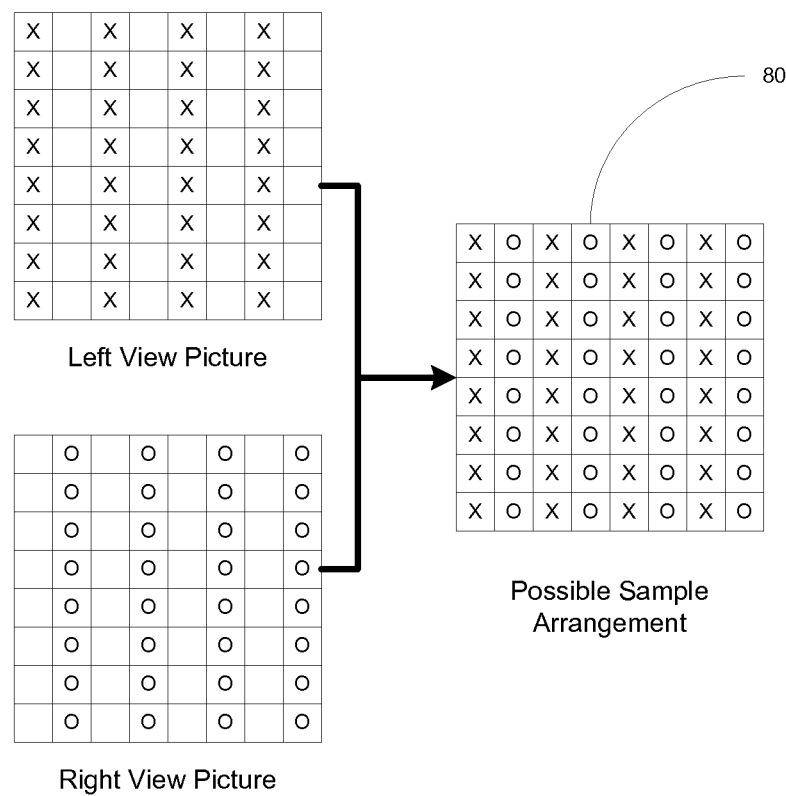
FIG. 8 shows multiplexing of samples using column interleaving.
Figure 9:
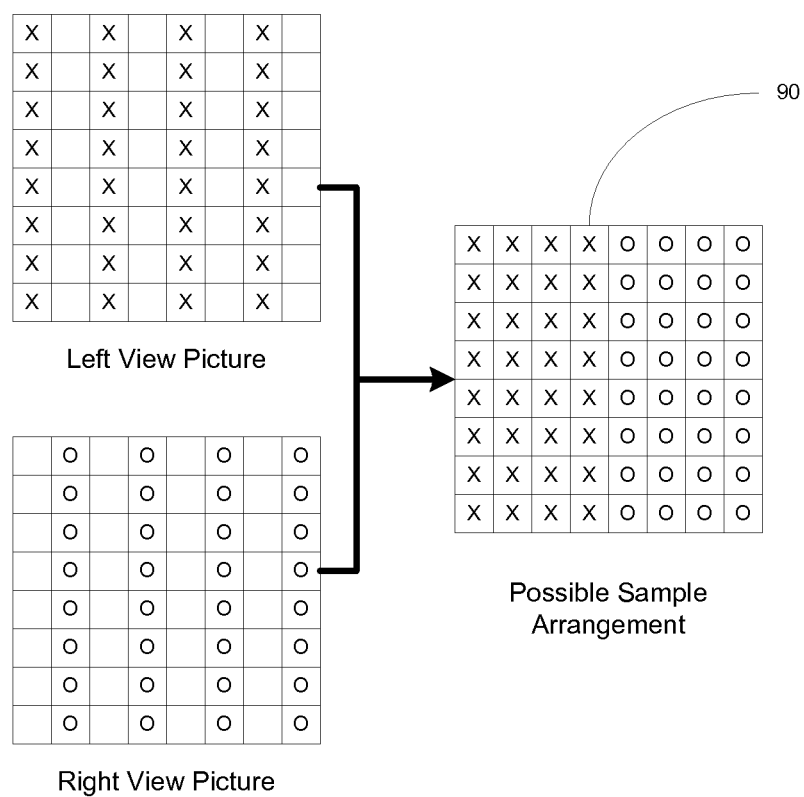
FIG. 9 shows multiplexing of samples using side by side-column.
Figure 10:
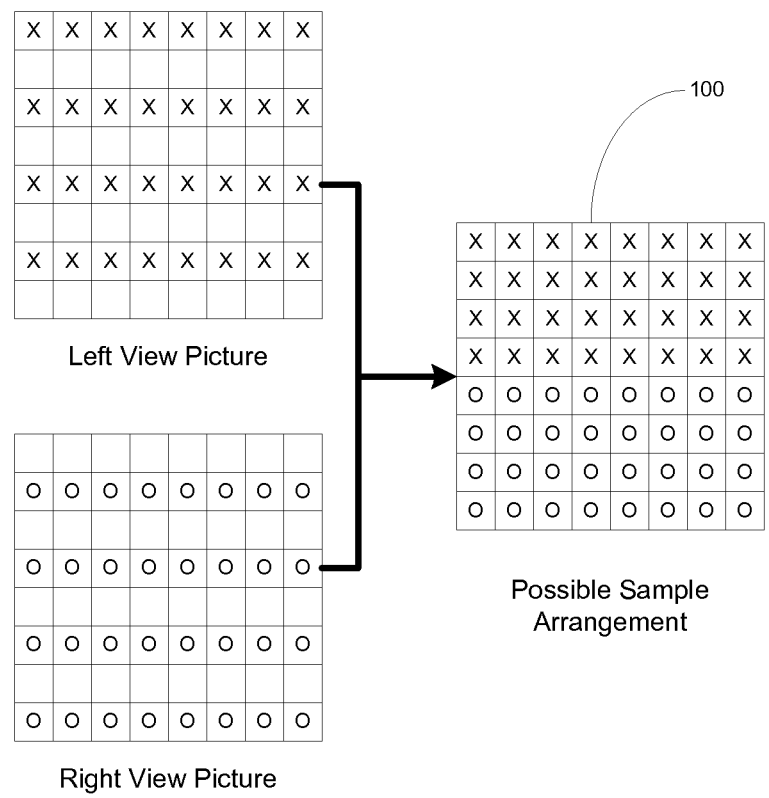
FIG. 10 shows multiplexing of samples using top-bottom row interleaving.
Figure 11:
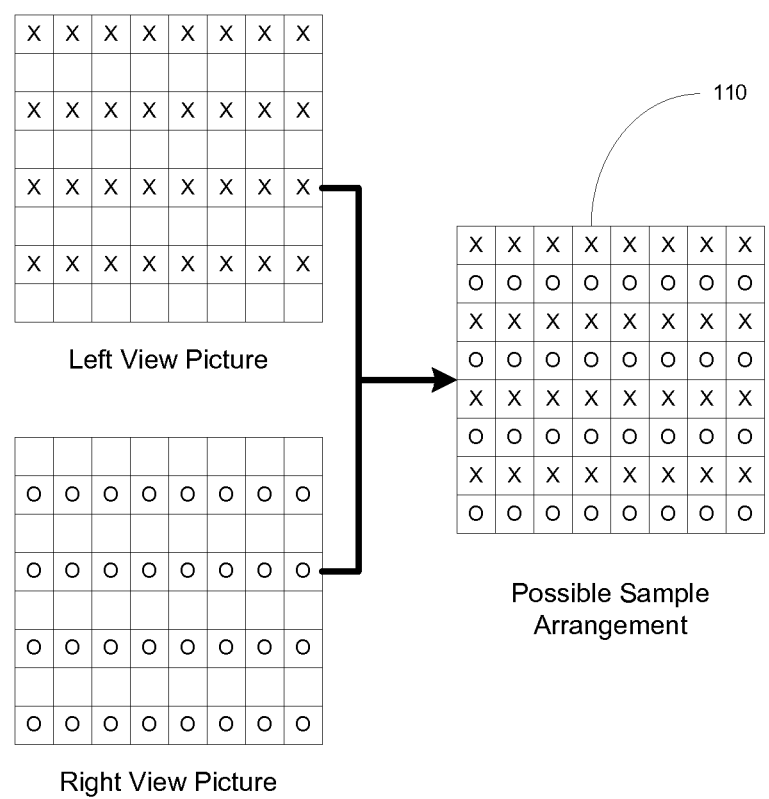
FIG. 11 shows multiplexing of samples using line interleaving.

Sampling and interleaving need not be limited to quincunx patterns. Different arrangements are also possible. One such arrangement (80) that involves column sampling and column interleaving is depicted in FIG. 8. Another arrangement (90) also known as "Side by Side-Column" that adopts column sampling and side-by-side interleaving is shown in FIG. 9. An arrangement (100) also known as "Top bottom-Row" or "Over-Under" that uses row sampling and top-bottom interleaving is illustrated in FIG. 10. Last, an arrangement (110) also known as "line interleaving" or "Row-Row" that applies row sampling and row interleaving is shown in FIG. 11.

All of the aforementioned sampling arrangements result to very different signal characteristics than those of the original image or video data. While 3D-stereoscopic data have been discussed above, similar conclusions are also drawn when considering e.g. interlaced signals which are characterized by row sampling in the temporal domain and row interleaving. Another application is processing of single-view data that are sampled (e.g. down-sampled by a factor of two) from the original source. Algorithms, such as denoising, deblocking, enhancement, generic low-or-high pass filtering, Wiener filters, among others, have to be adapted to ensure the intended results.

The case of deblocking for a quincunx-sampled picture will now be discussed.

Sampled and interleaved video data, as the CB picture of FIG. 5, can be compressed [see reference 3, incorporated herein by reference in its entirety] with a variety of video codecs including the ITU-T H.264/ISO MPEG-4 AVC [see reference 4, incorporated herein by reference in its entirety] video coding standard, MPEG-2, and the SMPTE VC-1 [see reference 5, incorporated herein by reference in its entirety] video coding standard, among others. A component of many video coding standards is the use of deblocking and other filtering mechanisms which may be both "in-loop" or "off-loop". In-loop processing in general refers to processing that is applied to samples that are subsequently used to predict other samples. This process has to be mirrored both at the encoder and the decoder so that the end result is identical. Off-loop processing refers to processing that is applied to a sample prior to its coding or after it has left the coding chain and is on its way to the display or some other subsequent processing stage. The former is often known as pre-processing, while the latter as post-processing. The intermediate "processing" step involves any operation (including coding and reconstruction) that may affect the samples. The in-loop deblocking stage can be critical for many applications since it can remove blocking artifacts that are the result of the block based prediction, e.g. intra or hybrid block-based motion compensated prediction, and block-based transform and quantization processes that are the foundation of most coding standards.

In inter prediction, block motion compensation is used to predict each block in the current picture with a combination of rectangular blocks in one or more reference pictures. The prediction blocks need not be co-located with the current block. Prediction models, which include the translational, affine, and perspective model, may be used to derive the prediction blocks. The reference pictures may be drawn from the past, future, or, in future codecs, prediction blocks can even originate from the same picture. In intra prediction, a block in the current picture is predicted solely from already reconstructed or decoded samples of the current picture. The prediction may be as simple as, e.g. copying the available top samples values, or using a prediction model to predict the current block with samples in some e.g. remote area of the same picture.

Intra and inter prediction form the backbone of most practical and commercial video codecs. For coarse quantization of the prediction residual, the block nature of the prediction process can create visual artifacts along block boundaries, known as blocking artifacts. Blocking artifacts manifest as visual discontinuities along the horizontal and/or vertical block boundaries. Apart from the visual degradation, these artifacts can also degrade the prediction efficiency of block-based motion compensation. As a result, a video codec may adopt in-loop deblocking to suppress these artifacts and improve coding efficiency. Deblocking can also be part of a post-processing system that could be located in the display itself. In general, modern deblocking algorithms use adaptive filters that suppress the visible discontinuity across samples at the block boundaries. Note that apart from blocking artifacts, several other artifact types result from the coding process that applies quantization to the prediction residuals. These include ringing, noise, and blurring artifacts, among others. The discussion on deblocking issues can thus be extended to the application of deblurring, denoising, and deringing algorithms on sampled and multiplexed video content.

Figure 12:
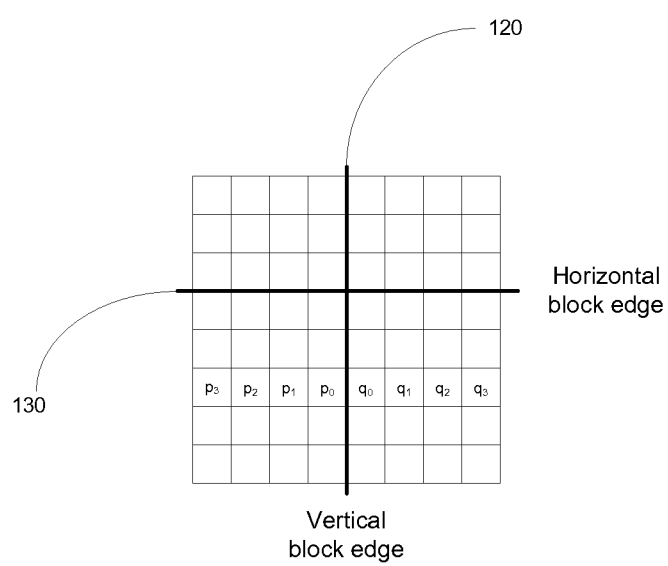
FIG. 12 shows an example of samples to be de-blocked in a single line that is divided by a vertical block edge.

An example block boundary is shown in FIG. 12. Let $p_i$ denote pixels at the left side of the block boundary (120) and $q_i$ denote pixels at the right side of the block boundary (120). While the depicted boundary is vertical, similar considerations can be made with respect to horizontal block boundaries (130). The H.264/MPEG-4 AVC deblocking algorithm takes as input those eight pixels across the block boundary and updates them based on a host of parameters that include the coding mode, coding parameters, intra prediction direction, energy of the residual, and motion parameters of the adjacent (neighboring) blocks, the filtering strength, the quantization parameters used to code the blocks, input constraints such as slicing structure, component type and chroma sub-sampling structure, average chrominance values, the transform type, the coding type (e.g. field or frame coding), and information from some base layer if the component picture is coded in some enhancement layer, among others. The de-blocked values $p'_i$ and $q'_i$ are functions of the input values from both sides of the block boundary (the target is to suppress the difference: therefore, the boundary p values will be blended with their neighboring q values). Deblocking may also be performed in the frequency domain. One such technique is based on overcomplete denoising principles [see reference 11, incorporated herein by reference in its entirety]. In overcomplete denoising methods, samples are transformed by overcomplete (redundant) transforms and are then adjusted using pre-defined thresholds. The thresholded transform coefficients are subsequently inversely transformed and combined (since they are many redundant/overcomplete values) to yield the final denoised samples. To perform deblocking these methods have been adapted to only consider values close to block boundaries. The methods can also adapt their thresholds according to the adjacent block modes, the QPs, the motion of the blocks, and the original and quantized transform coefficients, among others.

Figure 13:
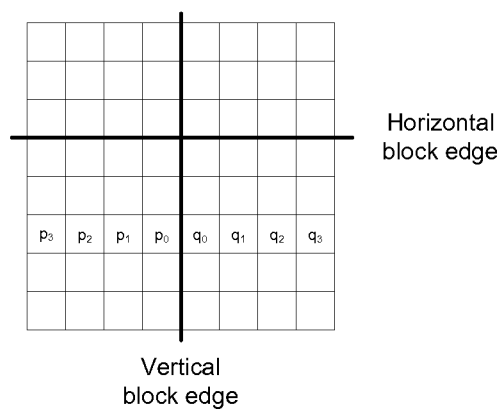
FIG. 13 shows an example where samples to be de-blocked do not necessarily belong to the same view. This can lead to cross-view contamination. In the example of the figure, the two shading types denote two different views.

Deblocking may benefit both compression efficiency and visual quality when performed as an in-loop processing step. Otherwise, visual quality may benefit when applied as a post-processing step. However, the straightforward application of traditional deblocking algorithms, such as the ones mentioned above, on sampled and interleaved video content may lead to undesirable consequences. Consider for example the case of the H.264/MPEG-4 AVC de-blocker that operates on the pixels of FIG. 12. For the case where 3D video content is sampled and interleaved, FIG. 13 illustrates that these pixels now belong to different views. The H.264/ AVC de-blocker will calculate the new de-blocked values as functions of all p and q values. If the stereo disparity between the views is very high, this process may result in highly undesirable cross-view contamination: pixels from view 0 (left) will contaminate the values of pixels from view 1 (right) and vice versa. Similar conclusions can also be drawn for other legacy deblocking schemes, which do not differentiate among the pixels of each view, such as the one used by SMPTE VC-1 codecs or overcomplete techniques. If no care is taken to avoid considering samples from one view when deblocking samples of the other, samples will be contaminated. For example, false frequencies may be created and the thresholds might well zero out real content and preserve the artifacts. While these issues clearly affect 1×1 quincunx-sampled and packaged 3D data (CB pictures), similar issues arise when considering generic (height/N)× (width/N) quincunx-sampled and packaged 3D data.

Figure 14:
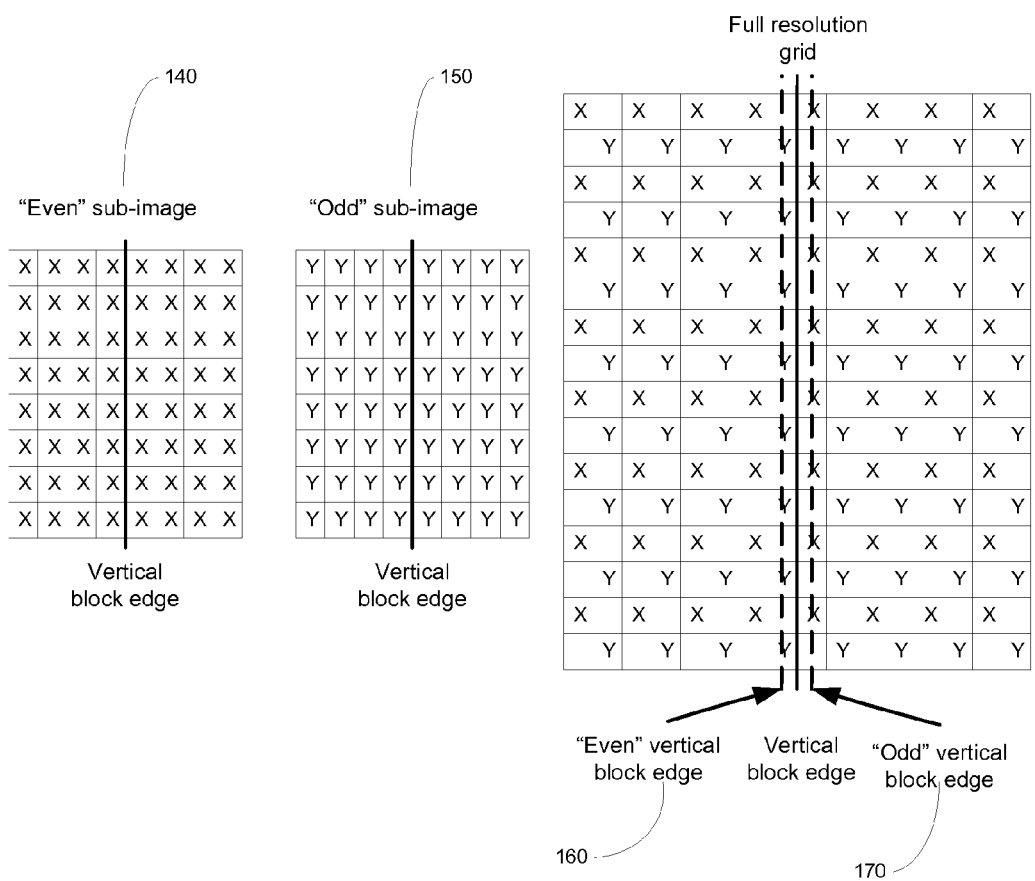
FIG. 14 shows deblocking issues for quadrant-quincunx video data.

Without loss of generality, the example of (height/2)× (width/2) quincunx-sampled and packaged 3D data will now be considered. In FIG. 14 the case where deblocking is applied directly to the "even" and "odd" sub-images (140, 150) of the same view is illustrated. In the sub-image domain the situation looks very different compared to the 1×1 3D data packaging of FIG. 5. All samples in a sub-image belong to the same view so existing algorithms can be applied directly without the need to account for samples of different views. However, the process is not as straightforward if one considers the full resolution grid, which is also shown in FIG. 14. The imaginary block boundary (shown with dotted lines) for one view sub-image (160) does not coincide with the imaginary block-boundary of the other sub-image (170) of the same view since deblocking will be done independently. Moreover, since these areas may not be coded with similar modes, the strength of the deblocking may vary for each sub-image. Inconsistent deblocking strength may contribute to see-saw artifacts along the imaginary boundaries in the full resolution image in FIG. 14.

Figure 15:
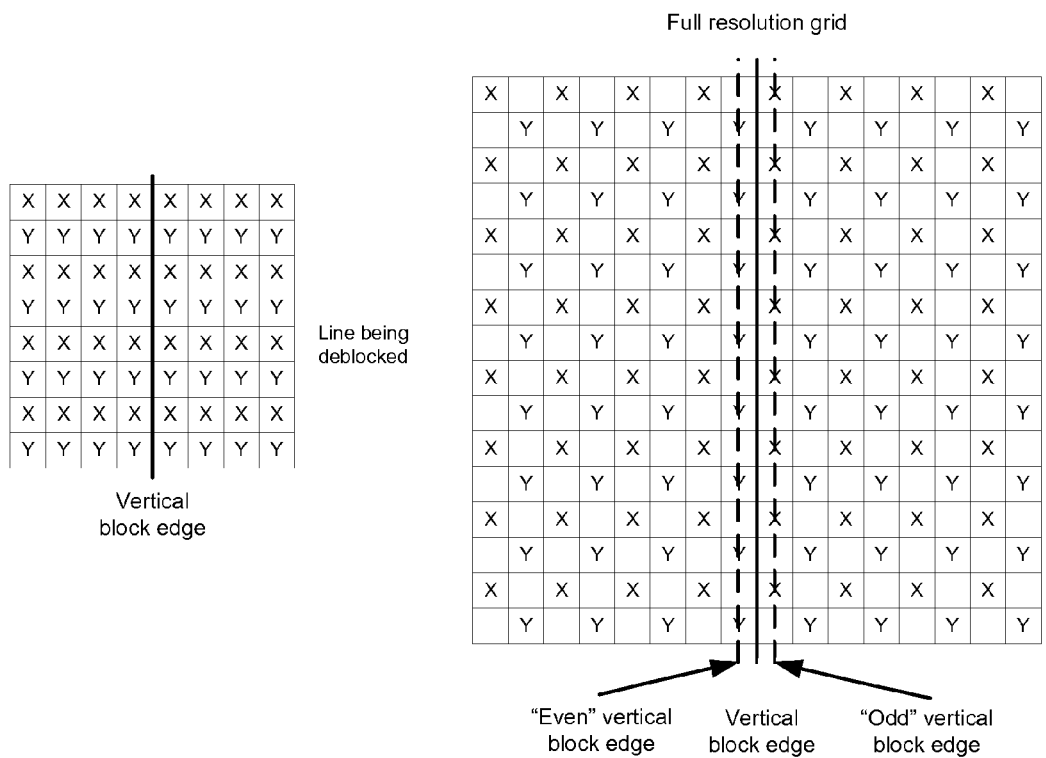
FIG. 15 shows deblocking issues for vertical edges for the side by side-quincunx arrangement.
Figure 16:
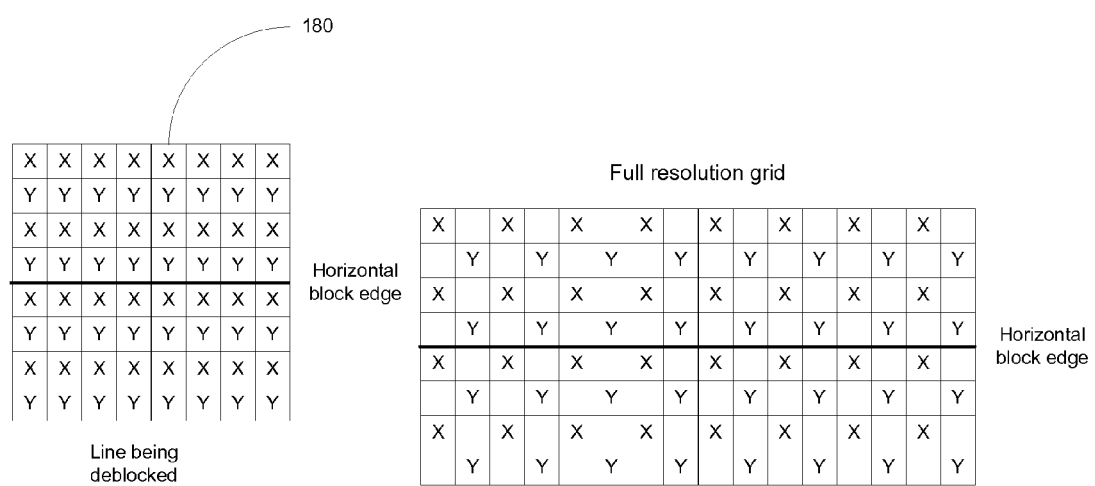
FIG. 16 shows deblocking issues for horizontal edges for the side by side-quincunx arrangement.

Similar issues also affect deblocking applied to "Side by Side-Quincunx" data. The situation is similar for vertical edges as with "Quadrant-Quincunx" data as shown in FIG. 15. See-saw artifacts may be created, among others. However, there are different and more severe issues when considering deblocking for horizontal edges. Such a case is depicted in FIG. 16. The "lines" (180) that are de-blocked consist of samples that are offset by one pixel in the horizontal direction for every line. Filtering across these samples, without taking into account their spatial positions in the full resolution grid, may contribute to visual degradation.

Figure 17:
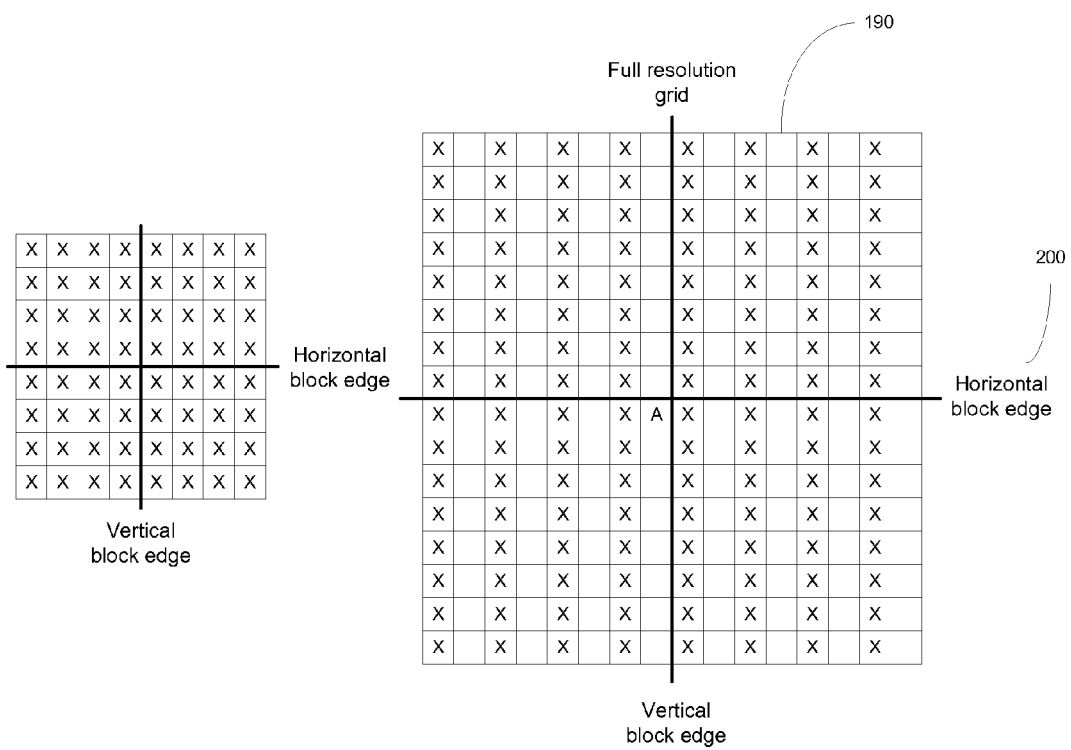
FIG. 17 shows side by side-column issues.
Figure 18:
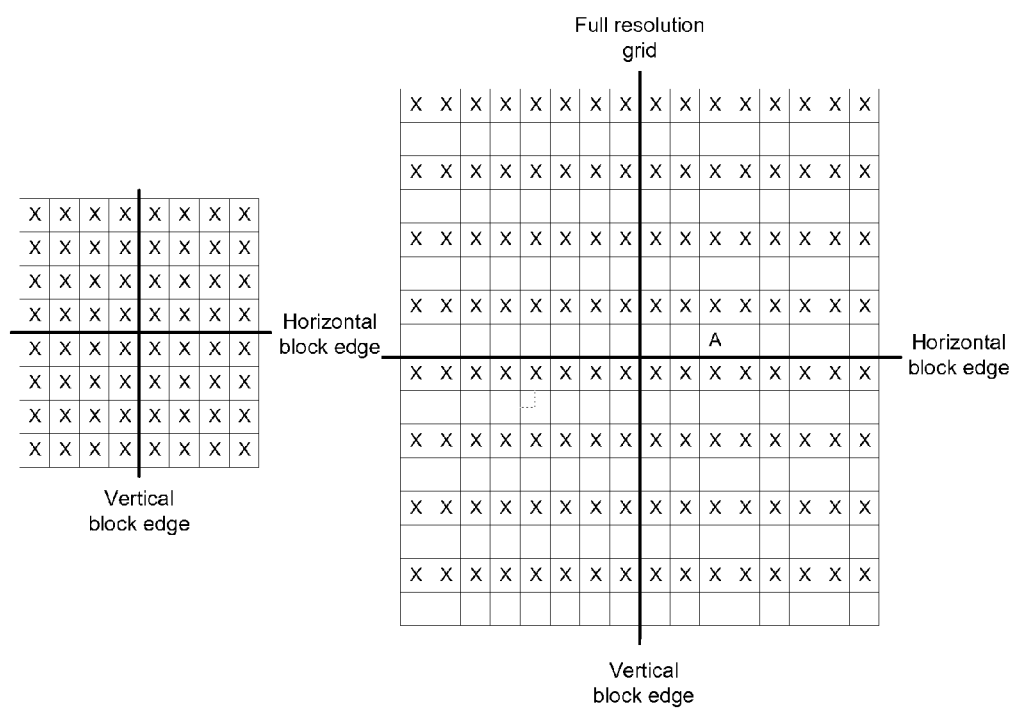
FIG. 18 shows top bottom-row issues.

These issues also affect data that adopt "Side by Side-Column" sampling and interleaving or the data that adopt "Side by Side-Column" interleaving only. The sampled and full resolution positions for the case of deblocking or even generic filtering are shown in FIG. 17. While processing in the vertical direction remains unchanged when considering full resolution content, the same is not true for the horizontal direction where the data are now farther apart when considering the full resolution grid (190). In addition, it can also be observed that the distance of the data from the actual block edge (200) is different in the horizontal direction. Similar problems are also witnessed when considering the case of "Top Bottom-Row" sampling and interleaving as depicted in FIG. 18. This time the samples in the horizontal direction correspond with the positions of the full resolution data. Instead, the samples in the vertical direction have larger distances and are also no equidistant to the block edge. In both cases, the sampled data have a different aspect ratio from the original data: 2:1/1:2 vs. 1:1. Straightforward application of the existing H.264 deblocking algorithm on such content will lead to suboptimal compression efficiency and subjective quality. Note also that the issues of FIG. 18 closely resemble issues one would encounter when processing the top or bottom field of an interlaced image. Better performance is possible when deblocking and, in general, processing algorithms consider the position of the samples in the full resolution grid.

As also mentioned above, deblocking is just one of possible processing methods that can be applied to sampled and multiplexed data. Denoising methods designed for full resolution data will also encounter issues when applied on sampled data. Overcomplete denoising methods are one such example, already mentioned above. There are though other, equally critical, operations whose efficiency is degraded when they are applied on sampled data in a straightforward manner. Consider for example the issue of fractional-pixel interpolation for a CB picture. Fractional-pixel interpolation is an in-loop processing step that is fundamental for high-performance motion-compensated prediction. While samples are represented with pixel accuracy, real-life motion often has fractional-pixel components. Fractional-pixel interpolation improves prediction efficiency by estimating these values. The following simple example showcases problems that can arise. Assume that in the CB picture of FIG. 5 two neighboring pixels a and b are present. Obviously, each one belongs to a different view. The half pixel interpolation for the missing sample that is located between a and b will however consider both pixels, resulting to cross-view contamination.

Several embodiments of the present disclosure are directed to a variety of methods for processing of sampled and interleaved image or video data.

Figure 19A:
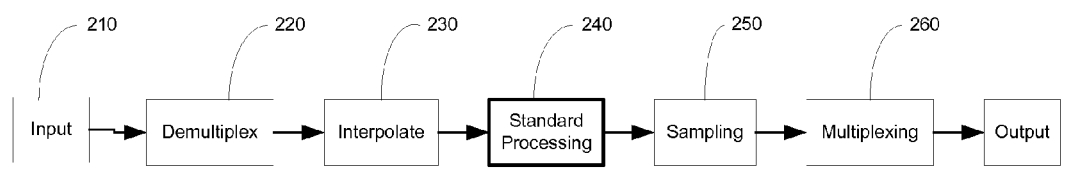
FIG. 19A shows a schematic diagram where processing of image or video samples is performed according to an embodiment of the disclosure.
Figure 19B:
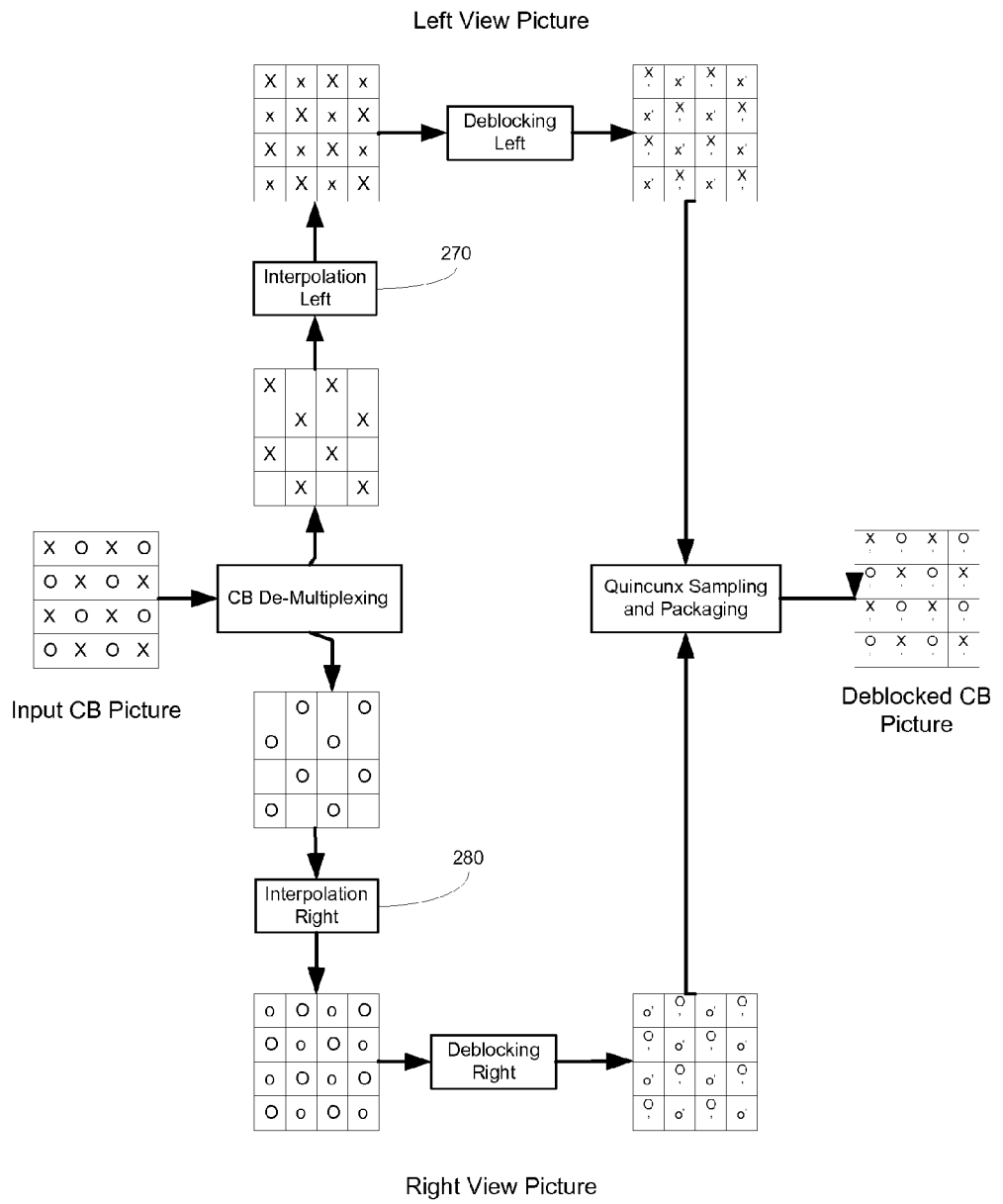
FIG. 19B shows an example of deblocking of quincunx-sampled and packaged content with full de-multiplexing and interpolation. Small letters denote values that are interpolated. y' denotes the de-blocked sample y.

(a) According to a first embodiment, full de-multiplexing and interpolation of the missing samples, followed by processing using available existing methods, originally developed for full-resolution rectangularly-sampled image or video data, and re-sampling with the original sampling pattern to regain the final processed samples is provided. Additional filtering may be performed during the sampling process. For example, during the re-sampling phase, instead of adopting the values of the samples at the sampled positions, filtering on-the-fly may be performed, so that the retained value is some (e.g. linear) combination (filtering) of the sample in the sampled position and other neighboring samples which may not necessarily belong to sampled positions. A first general diagram of this process is shown in FIG. 19A. A sampled video input (210) is multiplexed (220) to generate component representations (e.g., separate left and right pictures). Interpolation (230) on each component representation is then performed, followed by standard processing (240) on each representation. After processing, the component representations are sampled (250) and multiplexed or packaged (260) together. The terms multiplexing and packaging will be used interchangeably in the present disclosure. A diagram of this process for the case of deblocking, as the processing algorithm, and sampling, e.g. quincunx, and multiplexing is shown in FIG. 19B. As shown in FIG. 19B, the interpolations (270, 280) in each component view or layer are independent of each other.

Figure 20:
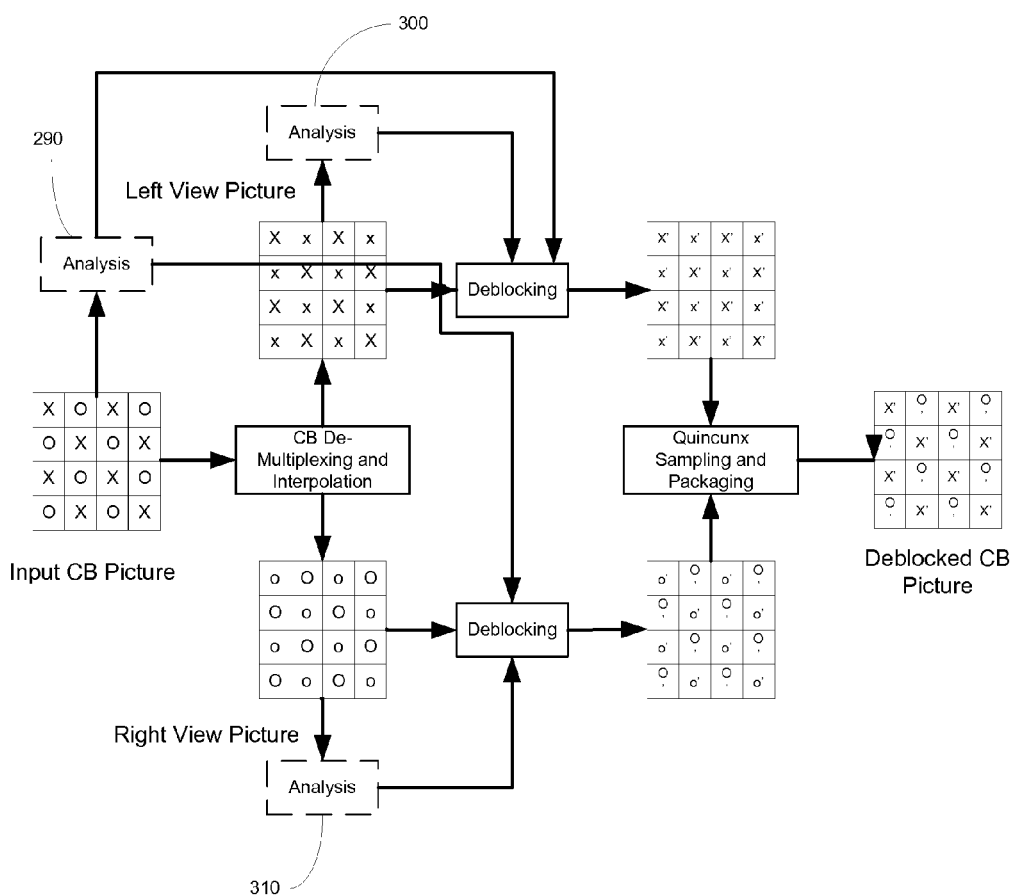
FIG. 20 shows an example of analysis-guided deblocking.

Performance may be further improved by analyzing the input sampled picture (e.g. a "CB" picture) and optionally the interpolated full resolution content (e.g. the left and right views) as shown in FIG. 20. Information that can be extracted by the analysis modules (290, 300, 310) of FIG. 20 includes and is not limited to: (a) Estimate of the stereo disparity, which may be used to control the contribution of samples from different views when processing samples of the current view. By way of example, for low disparity it makes sense to consider samples from the other view despite any potential contamination. (b) Edge and frequency characteristics that may again be used to guide the filtering process. For example, for a highly textured region limited or no deblocking at all can be used. Estimates or knowledge of the horizontal and vertical correlation may also be useful in guiding the design of the interpolation filters (as in the case of interlaced samples and those of FIG. 17 and FIG. 18). (c) Average luminance and chrominance values can also guide filtering. High luminance, for example, masks artifacts and subsequent filtering operation can account for that.

(b) Further embodiments of the present disclosure deal with processing of the sampled input on-the-fly without full re-sampling, de-multiplexing, or interpolation of the sampled input to the full resolution image or video data. These embodiments modify the processing algorithm so that the processing algorithm becomes aware of the position of each sample of the sampled picture in the full resolution grid. For 3D stereoscopic content this means that the processor differentiates between samples that are in different views and/or locations. In the case of interlaced content the processor exploits the fact that vertical neighbors in the top or bottom field have twice the spatial distance when compared to horizontal neighbors. For interleaved image or video data the processor differentiates between data belonging to one category and data belonging to a different category and depending on the objective of the processing algorithm may select to avoid contamination across those different types. When the data is sampled, the processor exploits the knowledge of the actual position in the full resolution grid for each sample in the sampled image or video data. There can be cases where neighboring samples in the full resolution grid are placed into distant positions in the sampled picture or vice versa. Such knowledge can be exploited as well. While in some embodiments full interpolation of the sampled input data is avoided, in other embodiments limited interpolation is allowed when the processing gain greatly outweighs the computational and memory complexity increase. For example, in the case of deblocking, missing samples adjacent to block boundaries may be interpolated and considered during the processing stage. Some particular embodiments will now be considered.

Consider the case of deblocking for quincunx-sampled and interleaved 3D stereoscopic data (CB). For proper deblocking the issue of cross-view contamination should be addressed. De-blocked samples of one view shall not be contaminated with samples of the other view. This constraint may be relaxed by requiring that samples from the same view are allocated larger weights (when combined) than samples of the other view or that a similarity measure between left and right view samples is computed, as in FIG. 20, before considering them for deblocking. Since coarse quantization may actually already contaminate the two views prior to the deblocking process, it may make sense to take all samples into account albeit with different weights. These weights can be adapted based on the coding parameters and statistics, such as the quantization parameters, the percentage of non-zero transform coefficients, the coding modes, the position of the block, the type of the component, and the chroma sub-sampling type, among others.

Figure 21:
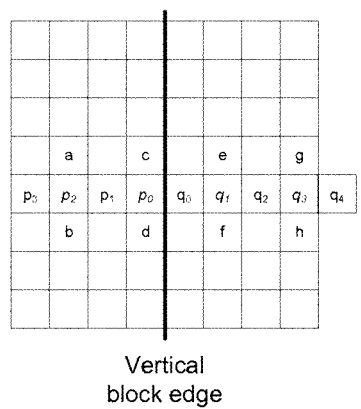
FIG. 21 shows a deblocking strategy for a bilinear interpolation filter on quincunx-sampled and packaged data. Italics denote values that have to be interpolated.

(b1) An example of this embodiment in the case of deblocking of "CB" data is shown in FIG. 21. The simplest solution to implement is to perform deblocking by assuming that values $p_2$, $p_0$, $q_1$, and $q_3$ are consecutive pixels across a boundary between the p and q values. The remaining pixels, $p_3$, $p_1$, $q_0$, and $q_2$ are processed independently in similar fashion. While this first embodiment will avoid cross-view contamination, deblocking performance may not be as efficient since the number of samples is now lower and at the same time they have different distances from the block boundary: e.g. sample $p_3$ is further apart from the boundary than sample $q_2$. This should be accounted during filtering for better results. In absence of interpolation, this may be addressed by applying different weights to each sample value during filtering or deblocking. For example, for samples $p_2$, $p_0$, $q_1$ and $q_3$ one may adopt the following weights that depend on their distance (considering each pair) from the block boundary: 7/12, 3/4, 1/4 and 5/12. Improved performance could be obtained through interpolation which can generate all or some (e.g. the ones closer to the edge) of the missing samples on the fly and utilize them jointly with the existing ones when performing deblocking. In the case of FIG. 21 one can interpolate the missing samples as follows:

$$\hat{p}_2 = \frac{(a + b + p_3 + p_1)}{4}$$

$$\hat{p}_0 = \frac{(c + d + p_1)}{3}$$

$$\hat{q}_1 = \frac{(e + f + q_0 + q_2)}{4}$$

$$\hat{q}_3 = \frac{(g + h + q_2 + q_4)}{4}$$

In this example, without loss of generality, a simple bilinear filter has been used to interpolate the missing samples. Note that when interpolating the missing samples to perform deblocking across the block boundaries, only samples that belong to the same block boundary side as the sample position to be interpolated may be considered. The deblocking process is now performed on four contiguous samples on each side of the boundary, e.g. with the algorithm used in H.264, for a total of eight available samples. The samples at the interpolated positions are not updated with the deblocking process. Only samples that belong to the current view, $p_3$, $p_1$, $q_0$, and $q_2$ are updated with values $p'_3$, $p'_1$, $q'_0$, and $q'_2$.

Different embodiments may use more sophisticated interpolation methods to estimate the missing samples that may include edge-adaptive filtering [see reference 8, incorporated herein by reference in its entirety], separable and non-separable filters with longer support, or prediction from future or past pictures, among others. Compared to traditional interpolation and de-multiplexing, care has to be taken to avoid considering samples from one side of the boundary when interpolating samples in the other side of the boundary. Complexity may be reduced by only interpolating the closest one or two samples to the block boundary, in this case $\hat{p}_0$.

(b2) A different embodiment addresses deblocking for generic (height/N)×(width/N) quincunx-sampled and packaged 3D data. Without loss of generality, the example of (height/2)×(width/2) quincunx-sampled and packaged 3D data ("Quadrant-Quincunx") of FIG. 14 is considered. For optimal deblocking performance deblocking in the "even" sub-image for a given block edge is coupled with deblocking of the same edge in the "odd" sub-image.

Figure 22:
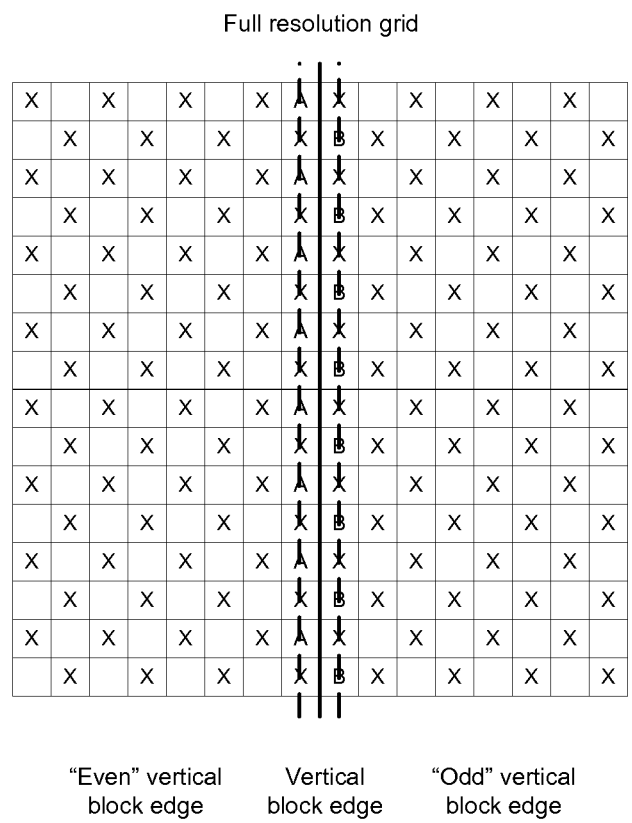
FIG. 22 shows a deblocking strategy for packed quincunx-sampled video data.

One possible embodiment of this strategy is depicted in FIG. 22. For reference, the positions of the samples in each sub-image in the original full resolution grid are illustrated. Prior to deblocking the "even" sub-image samples, the "A" samples are interpolated using neighboring "even" and "odd" samples of the same view. Similarly, prior to deblocking the "odd" sub-image samples the B samples are interpolated using neighboring "odd" and "even" samples of the same view. Interpolation can be as simple as bilinear and as complex as content and edge adaptive, or even inpainting. Deblocking for the "even" sub-image proceeds then by also considering the value of sample "A", and by adjusting the deblocking filter values to consider the fact that the distance of the sample from the block boundary in the sub-image is not necessarily equal to the equivalent distance in the full resolution grid.

By way of example, let $x_1$ and $x_2$ be two "even" sub-image samples that sit across a block boundary. Let $A_1$ denote the interpolated sample between them that also sits on the same horizontal line. Assume it is desired to de-block those two samples by simply setting them equal to their average value: each pixel gets a weight of one half: $x'_1=x'_2=(x_1+x_2)/2$. The same process is applied for the "odd" sub-image samples that sit across the same boundary on top and below that same horizontal line. This may create see-saw artifacts as mentioned before. A more proper deblocking procedure is to adapt the filter weights to consider the full-resolution distances, and preferably also consider the "A" or "B" samples, for "even" or "odd" sub-image samples, respectively. The end result is now: $x'_1=x'_2=(2\times A_1+x_1+3\times x_2)/6$.

(b3) An additional embodiment addresses filtering (e.g. deblocking) for "Side by Side-Column" as previously depicted in FIG. 17. As discussed before, the samples in the sampled and interleaved image have different aspect ratio: the horizontal dimension is sub-sampled by a factor of two while all samples are retained in the vertical direction. This observation leads to modify the filter lengths so that they account for this discrepancy. Filtering in the horizontal direction could consider half the number of continuous samples as compared to filtering in the vertical direction provided the original content, prior to sampling, was obtained using progressive-scan. Otherwise, excessive blurring may be introduced and substantial high frequency information may be lost in the horizontal direction. Furthermore, as noted before, the distance of the samples from the full-resolution block edge is not the same for either side of the edge. Let $x_1$ and $x_2$ be two neighboring horizontal samples that sit across a block boundary of the sampled and interleaved image (left on FIG. 17). For the case of e.g. deblocking, sample $x_2$ has to be given additional weight. For a simple bilinear filter $x'_1=x'_2=(x_1+2\times x_2)/6$ can thus be derived. Similarly to the previous paragraph, the missing full resolution sample A between these two samples may be interpolated to improve filtering efficiency further. Note also that when processing samples of the other view, it will be $x_1$ that will be allocated a larger weight. The embodiment described in this paragraph is also applicable for the case of "Top Bottom-Row" as depicted in FIG. 18 by simply replacing "horizontal" with "vertical" (and vice versa) in the above discussion. Note that in the case of e.g. interlace-scan content one may want to use the original deblocking strategy without curtailing the number of the filter taps. Alternatively, for the interlace-scan case, one may wish to constrain the extent of the filtering equally across both directions, vertically and horizontally. In general, one should consider not only the sampling and multiplexing that is applied to the input content but also how the input content was produced (e.g. progressive or interlace, among others) in the first place.

The methods described so far entail some limited or more extensive interpolation of missing samples in order to improve the efficiency of the deblocking processing step or when interpolation is required or desired, in order to apply a separable processing step first on one direction and then on the other ("separable" operation).

(b4) It is possible, however, to avoid interpolation of missing samples if the direction of the processing step, e.g. deblocking, is modified to be of a direction different than vertical or horizontal, e.g. diagonal. A visual example for the "CB" arrangement is shown in FIG. 23. To avoid contamination of samples from other views and avoid interpolating missing samples, deblocking (e.g. the H.264 algorithm that requires four samples across each side of the block edge) is applied along diagonal samples $p_{10}$, $p_{21}$, $p_{32}$, $p_{43}$, $p_{54}$, $p_{65}$, $p_{76}$, and $p_{87}$, or may be applied along diagonal samples $p_{70}$, $p_{61}$, $p_{52}$, $p_{43}$, $p_{34}$, $p_{25}$, $p_{16}$, and $p_{07}$, or alternatively may be applied first on the first set of diagonal samples and secondly on the second set of diagonal samples to avoid biasing the deblocked samples along a single direction. The decision on which direction to apply filtering and how many instances to use for interpolation, as described above, may be fixed, or may be signaled. Such a decision may be aided by pre-analysis that determines orientation and spatial characteristics of the source signal. Furthermore, this embodiment for processing, e.g. deblocking, of sample data along alternative directions may be applied for any operation that involves processing of samples that have been sampled from their original spatial position and resolution.

Figure 24:
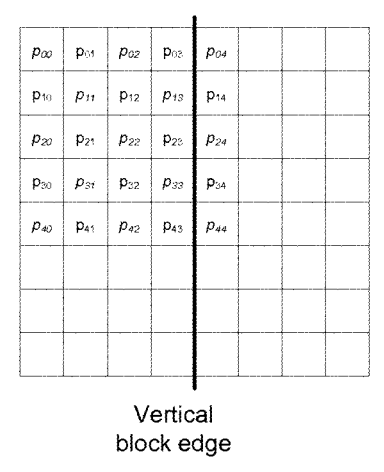

(b5) A different embodiment considers interpolation of sampled and interleaved data for motion compensated prediction. This embodiment is again based on considering the distances of the samples in the full-resolution grid and the category (e.g. view) to which the current sample belongs to. Sometimes, the block to be predicted contains data belonging to more than one category. For certain motion parameters a prediction block will have data that match the categories of the data in the current block. However, for other motion parameters this will not hold. Reference can be made, for example, to a CB picture as shown in FIG. 24: in case the current block is to be matched with an interpolated block in the reference picture buffer, it can be observed in FIG. 24 that only every other two pixels there is correspondence in the views ordering so that a pixel from view 0 is predicted from a pixel from the same view 0, and similarly for pixels of view 1. When the data is not properly aligned, this results to a loss in motion compensation efficiency due to cross-category contamination. Such problem is solved in the present embodiment by interpolating the missing data for each category by considering only samples of the same category. Then, during formation of the prediction block, either the existing or the interpolated data are selected, so that the data categories of the current and prediction block are exactly aligned.

(c) Processing is done prior or after de-multiplexing or down-sampling in practical systems. In the following embodiments, algorithms that combine processing and de-multiplexing or processing and sampling simultaneously in a single joint step will be shown. De-multiplexing involves interpolation of missing samples from neighboring samples, preferably of the same category. Embodiments of the present disclosure are directed at modifying the interpolation filters or filter coefficients so that they also perform the function of the processing step at the same time (e.g. deblocking). Similarly, when sampling the data, a delta function or a low-pass filter can be used to account for aliasing. An embodiment related to joint deblocking and de-multiplexing will now be described.

Deblocking is a sample processing stage that is often (e.g. H.264/MPEG-4 AVC and VC-1) implemented as a separate processing module. Deblocking may be applied either prior to a de-multiplexing operation that derives the full resolution samples or after a sampling process (e.g. quincunx) that derives data of each category (e.g. to form a CB picture) from the full resolution data. It is possible to combine deblocking with de-multiplexing or combine deblocking with sampling. While de-multiplexing or sampling operations can be quite complex when targeting optimal quality, Applicants will show examples that explain how deblocking can be combined with these operations. These combinations benefit from reduced computations and memory accesses compared to separate application of those operations. Furthermore, the joint application of deblocking and re-sampling (either to or from the sampled signal) may also benefit quality as re-sampling operations exploit the knowledge about block boundaries. Joint deblocking and de-multiplexing involves modifying the de-multiplexing/interpolation filters when processing samples that are close or at block boundaries. The filter support may also be extended to consider more samples from the other side of the boundary, all with the objective of minimizing signal transition inconsistencies across block boundaries.

(c1) An embodiment for the case of a bilinear interpolation filter and a CB picture is shown in FIG. 24. Samples highlighted with the darker color are already available and we wish to interpolate the missing samples and at the same time de-block the signal. Traditional interpolation with the bilinear filter would estimate the sample at position (3, 3) as: $\hat{p}_2 = (p_{23} + p_{32} + p_{43} + p_{34})/4$. The existing value of the sample at (3, 3) corresponds to the other layer/view (view 1), while the four sample values that are averaged belong to view 0. If it is desired to perform deblocking in a single step, the location of the interpolated sample can be considered. Since it is located close (in this case next) to a block boundary the filtering operation is modified as follows in order to perform interpolation and deblocking in a single step:

$$\hat{p}_2 = \frac{\beta \times (p_{23} + p_{32} + p_{43}) + \alpha \times p_{34}}{3 \times \beta + \alpha}.$$

The condition that $\alpha > \beta$ is imposed. This ensures a larger weight for the sample at the other side of the boundary to improve spatial consistency across block boundaries. The weights depend on a host of parameters that include the quantization parameters of the neighboring blocks, the coding modes and motion parameters of the blocks, and spatial characteristics (texture vs. smooth areas), among others. An identical process may also be applied to the other view as well as the pixels of the same view at the other side of the block boundary. In fact, in the case of deblocking and de-multiplexing of a "CB" picture, since pixels of either view were coded with identical coding modes and quantization parameters for a given block, the above weights can be calculated once and used for joint de-multiplexing and deblocking of all views within the block.

(c2) Similar embodiments can also be defined for non-quincunx sampled content such as "Side by Side-Column" and "Top Bottom-Row", as previously shown in FIG. 17 and FIG. 18. Assume that we wish to simultaneously deblock and interpolate missing sample A of FIG. 17. Using previously introduced notation and assuming a simple bilinear filter we derive the interpolated sample as: $A=(x_1+x_2)/2$. The jointly processed sample will be derived as $$A = \frac{\beta \times x_1 + \alpha \times x_2}{\beta + \alpha}.$$

Again, we impose the condition that $\alpha > \beta$ for the exact same reasons articulated in the previous paragraph. The strategies described in both paragraphs are also applicable to more complex interpolation schemes that may be combined with processing operations such as edge-adaptive filtering, Lanczos filtering, among others.

Joint deblocking and de-multiplexing is not only possible in the pixel domain but also in the frequency domain. Frequency-based approaches applied for deblocking are mentioned in reference 11, incorporated herein by reference in its entirety. The same overcomplete denoising principles have also been used before to recover missing areas [see reference 12, incorporated herein by reference in its entirety] in images. Overcomplete denoising is based on applying multiple redundant shifted versions of a transform on the same data, thresholding of the transform coefficients, inversion transformation of the coefficients, and combination of the resulting values to yield the final processed samples.

Figure 25:
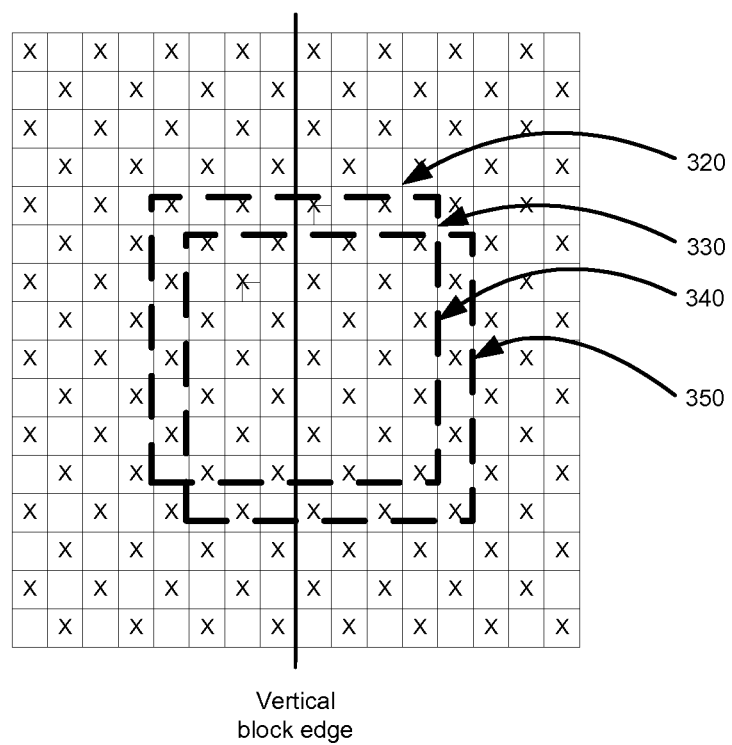
FIG. 25 shows joint de-multiplexing interpolation and deblocking using overcomplete denoising principles. The unshaded examples are being interpolated. Deblocking affects all shaded samples that are in the proximity of the block boundary.

(c3) Reference will be made to FIG. 25. Two 4×4 overlapping "blocks" (320, 330) of existing samples of the same category, in this case the same view, are highlighted with different shades, both of which are marked with "x". The goal is to interpolate missing samples and de-block at the same time. First, a transform is applied to each overlapping block. The transform can be of M×1, 1×N, or diagonal, and also of M×N size given different aspect ratios. In the depicted case it is the 4×4 integer Discrete Cosine Transform (DCT) or the 4×4 Hadamard transform. The transform coefficients, e.g. of M×N size are then used to estimate the 2M×2N size transform coefficients that correspond to the same spatial area of support as that of the M×N size transform. In the depicted case, the 4×4 transform coefficients are then converted to their equivalents in an 8×8 transform, e.g. the integer DCT transform. Thus, the frequency information for the 8×8 block (340, 350) that is delimited by the 4×4 "block" (320, 330) of the existing samples is estimated. Note that the 4×4 block (e.g., 320) and the 8×8 block (e.g., 340) have the same spatial extent in the full grid. While the 4×4 block only contains existing samples of one category, the 8×8 block contains both existing and missing samples of the same category. These new transform coefficients may be adjusted as explained below, e.g. by thresholding, thus setting the coefficient to zero if it is over or below (usually below) some threshold. The thresholds are set so as to perform denoising and/or deblocking, among others. The modified (e.g. thresholded) transform coefficients are then inversely transformed to yield estimates for each one of the 8×8 samples, both existing and missing. It should be noted that estimates of existing samples are obtained for cases where one may want to update such values in order to ensure more coherent visual quality and avoid artifacts. For example, the existing samples may have been generated with the use of filtering that is optimized for display purposes, given the sampling pattern, but does not necessarily result to the same visual quality when recovering the missing samples in the full resolution grid. Each shifted overlapped "block" will yield a different estimate for each missing sample. These estimates may be combined in a linear or non-linear manner to yield the final estimate. To perform deblocking at the same time, the transform coefficients are adjusted based on a host of parameters, the inverse transform is applied, and estimates for each pixel corresponding to a plurality of parameters for each shifted transform are retained. This is a differentiating factor from traditional overcomplete denoising that yields a single estimate for each sample from each shifted transform. Then, depending on whether the sample is located close to a block boundary the appropriate estimate that corresponds to the appropriate set of parameters is used. This estimate is then combined with the final estimates of the rest of the overlapped/shifted transforms. The parameters used to adjust the coefficients depend on the quantization parameters, the coding modes, the spatial characteristics, the component and chroma sub-sampling type, and the proximity to the block boundary, among other factors.

Figure 26:
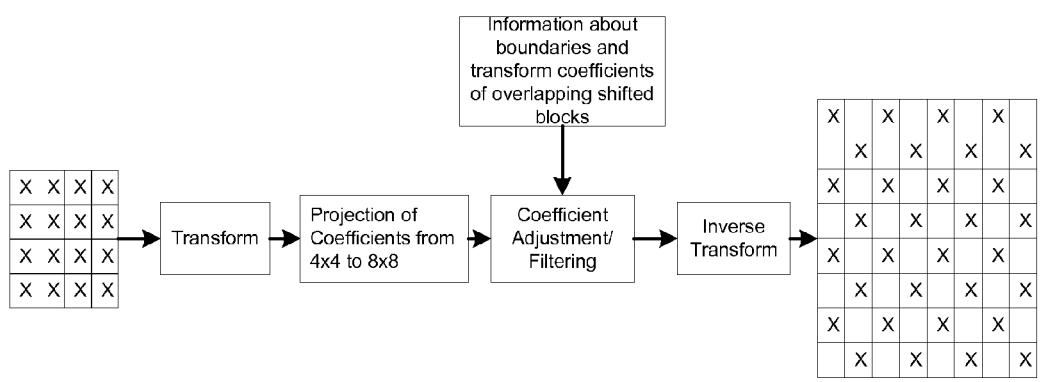
FIG. 26 shows an example of recovery of missing samples with overcomplete denoising methods.

A high level diagram that describes the operation on each block is shown in FIG. 26. Such embodiment can also be applied to joint denoising and de-multiplexing if the modification of the transform coefficients of the shifted blocks uses a single set of thresholding parameters (in contrast to the multiple ones we use above), and the process is applied to all samples (in contrast to applying it mostly for block boundaries).

Deblocking as well as other pre-processing, post-processing and in-loop processing operations, such as denoising, may be parameterized in the embodiments according to the present disclosure with the following parameters: (a) coding modes used to code the blocks that overlap the processed samples, (b) the motion of those blocks, be it translational, affine, or some higher-order motion model, (c) spatial statistics that include variance, edge information, frequency characteristics that may be gathered using a host of transforms (e.g. Fourier transform, integer discrete cosine transforms, wavelet transforms, the Hadamard transform, etc.), the block size used to code the samples, the signaled filtering strength, filter direction, and filter type (low or high-pass, bilinear or Lanczos, among others), the quantization parameters used to code the blocks, the block prediction residual, input constraints such as slicing structure, the component type (luma or chroma) and the chroma sub-sampling structure, the transform type, and the coding type (e.g. interlace or frame), among others.

Often it is desirable to signal instructions to the processing module. The instructions may refer to whole or parts/regions of pictures. These instructions include and are not limited to the following operations: (a) Switching on and off the processing operations for the designated region. (b) Controlling the types of filters used during processing (low- or high-pass, Lanczos, bilinear, filter direction, etc.). (c) Controlling the strength of the filtering (e.g. through the coefficients). (d) Signaling the filtering strategy (process the sampled picture directly or up-sample into e.g. full resolution views, process and then resample or even use overcomplete denoising principles). Since processing instructions may be signaled on a region basis, it is possible to select different processing algorithms for different regions. The criterion for such a decision could be distortion-related: the encoder could test all available methods since it has access to the original reference content and signal to the processing modules the methods that perform the best for each region.

For 3D stereoscopic content that adopts Side-by-Side or Top-Bottom interleaving, filtering operations in one view can be used to derive filtering parameters or thresholds that may guide the filtering operations in the other view. This is possible since the views are no longer interleaved on a pixel basis as with the quincunx interleaving patterns. The "Quadrant-Quincunx" pictures with large enough quadrants may also benefit from such a technique. Parameters such as deblocking filter strength, type, coefficients, and direction, among others, and various other filtering thresholds or coefficients that are estimated for one view can be applied to the other view. This applies to all ((a), (b) and (c)) embodiments presented above.

The embodiments described above for processing of sampled and interleaved data have several applications. A detailed description of specific methods and configurations follows.

Figure 27:
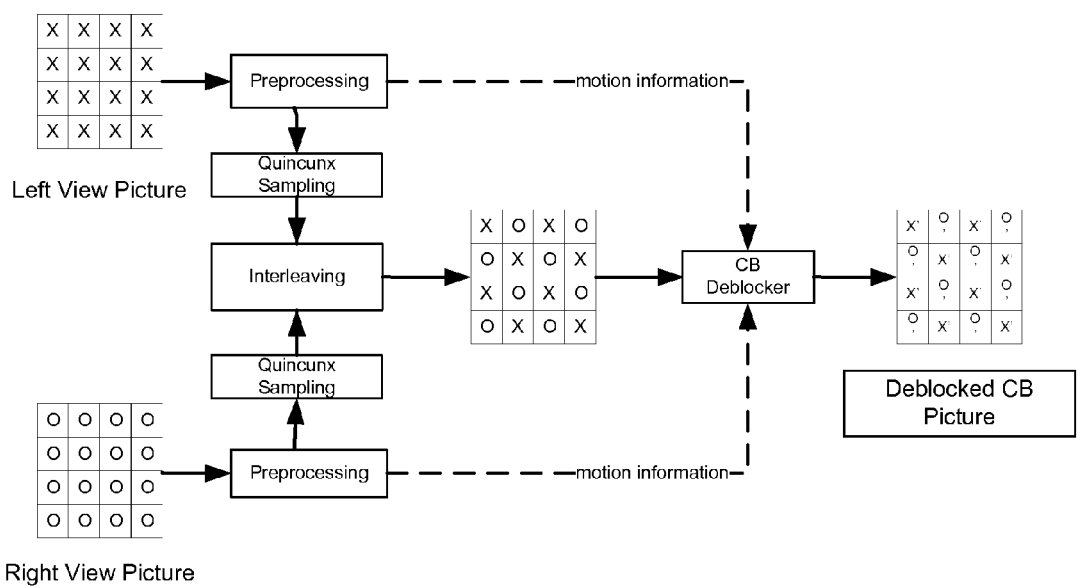
FIG. 27 shows an example of deblocking for preprocessing full resolution views.

(a) Pre-processing. Content is often pre-processed prior to e.g. compression. Pre-processing may include spatio-temporal filtering that involves block-based motion-compensated prediction. Prior to coding, the full-resolution content (e.g. left and right views) may be temporally filtered and then sampled and interleaved (e.g. in the "CB" format). Traditionally one would perform processing, such as deblocking or spatial filtering, on the full resolution content prior to the sampling and interleaving process. In accordance with embodiments of the present disclosure, processing is performed after the sampling and interleaving process using methods described below. The benefit of doing the process in that stage is that the samples that have to be processed are fewer (approximately half for the example of e.g. CB stereoscopic data packaging) leading to nontrivial savings in computational and memory complexity. A diagram of this embodiment is shown in FIG. 27.

Figure 28:
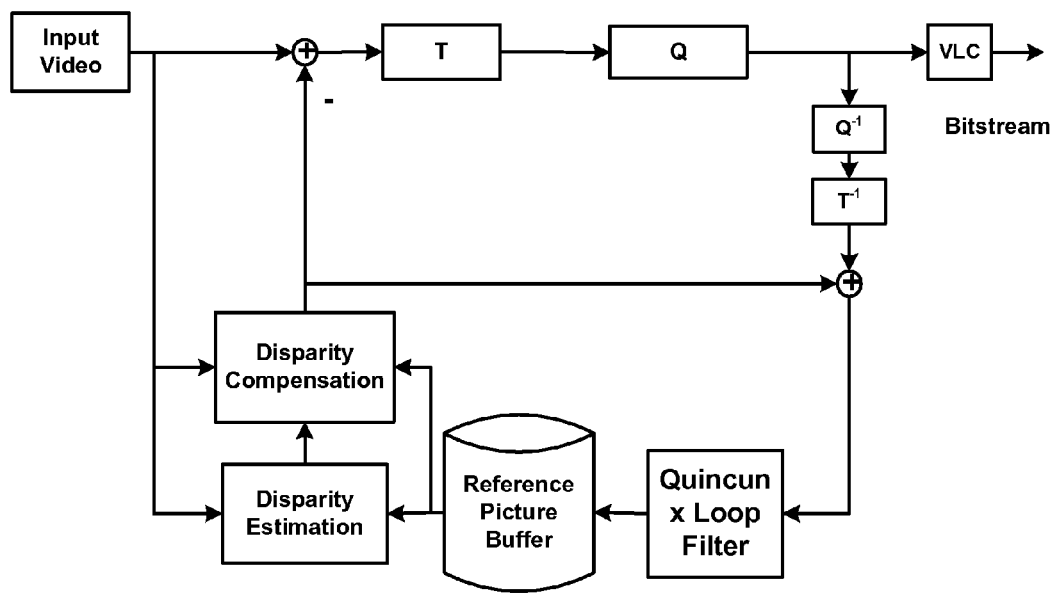
FIG. 28 shows an example of in-loop filtering for quincunx-sampled video data in a video encoder.
Figure 29:
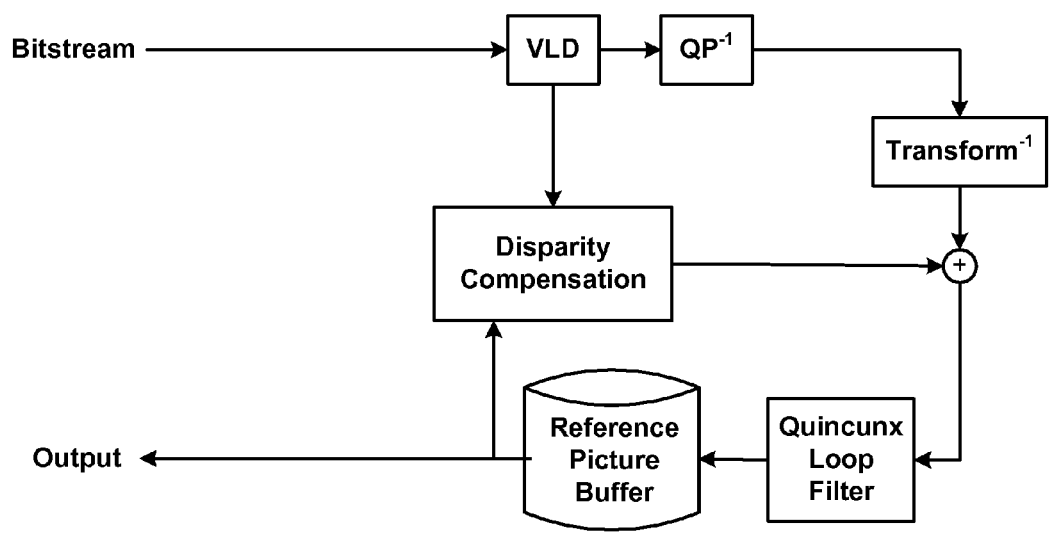
FIG. 29 shows an example of in-loop filtering for quincunx-sampled video data in a video decoder.

(b) In-loop processing/filtering for hybrid video compression. In-loop filtering may be applied during the coding process after the generation of a picture and prior to its storage in the reference buffer. In H.264/MPEG-4 AVC a picture is generated by adding the prediction residual to the prediction picture. Prior to storing the picture in the reference picture buffer so that it can be used as a motion compensated reference for subsequently coded pictures, the picture may undergo the deblocking process. The teachings of the present disclosure can be applied at this stage of the coding process. Diagrams of the encoder and the decoder this method are illustrated in FIG. 28 and FIG. 29, respectively.

(c) In-loop processing/filtering for a resolution-scalable video coding system. In such a system, a low resolution (sampled and interleaved) version of the full resolution content is coded in a so-called base layer (BL) bit stream (using e.g. an H.264 or a VC-1 codec). For example, a CB picture sampled and interleaved using the quincunx sampling pattern retains only half of the samples for each of the full resolution left and right views. CB pictures may hence be compressed in a so-called base layer (BL) bit stream (using e.g. an H.264 codec). However, the base layer is not limited to CB pictures or 3D stereoscopic content delivery alone. One for example may only compress the left or only the right view, a sampled version of a single view, or in the case of generic stereoscopic content one of possible arrangements may be used: "CB", "Quadrant-Quincunx", "Side by Side-Quincunx", "Side by Side-Column", "line interleaving", or "Top Bottom-Row", among others. Apart from 3D content one may apply such a system for the delivery of regular single-view content. The base layer may contain a sampled version of the single-view source. The full-resolution content may comprise a single or multiple views.

To regain the missing resolution (samples) one may perform prediction of the missing samples from the base layer bit stream and then code the missing samples' prediction residual, using some sampling pattern, in a secondary bit stream, that comprises one or multiple enhancement layers (EL). Another option is to perform prediction of the full-resolution samples using the samples coded in the base layer bit stream. This is especially useful when prior to the sampling operation that generates the BL samples, a filtering/processing stage is performed. In these cases, the samples in the BL do not necessarily maintain their original values as in the full resolution content. Note that in a system with multiple enhancement layers, the prediction of samples coded in one layer may depend not only on samples coded in the base layer but also in higher-priority enhancement layers. An EL is termed as having higher priority than another second EL if it can be decoded without requiring information stored in the second EL bitstream. Prior and following the prediction of the EL from BL it may also be desirable to perform in-loop filtering on the input and output samples. This filtering process may include low or high pass filtering, deblocking, de-interlacing, deringing, denoising, and other enhancement operations, among others. As far as the base layer is considered, these filtering operations are off-loop since the base layer operation is unaffected. However, when considering the overall scalable coding system these operations are in-loop and are required for correct decoding of the full resolution content. While the base layer encoder and decoder may optionally perform deblocking, denoising, deringing, among others, it is also possible and often desirable to perform in-loop processing (such as deblocking) at the enhancement layer or layers since the coding artifacts there may be unrelated with those in the base layer. The above scalable coding strategies may be implemented with the Scalable Video Coding (Annex G) or the Multiview Video Coding (Annex H) extensions of the H.264/MPEG-4 AVC video coding standard. It is also possible to implement a layered strategy with the base (Annex A) specification of H.264/AVC, MPEG-2, or VC-1, among others, by defining as enhancement layer frames that are designated as disposable (not used for motion-compensated prediction), as done for the purpose of temporal scalability.

A processing or filtering algorithm, such as deblocking, consists of two separate steps: (a) the derivation of the parameters that will guide the filtering process, and (b) the application of processing on the samples using the parameters derived in the previous step. Often the parameters used for processing at the enhancement layer may be highly correlated with those at the base layer. Consequently, processing efficiency may benefit if base layer information is (re-)used to initialize and guide the operation at the enhancement layer.

Figure 30:
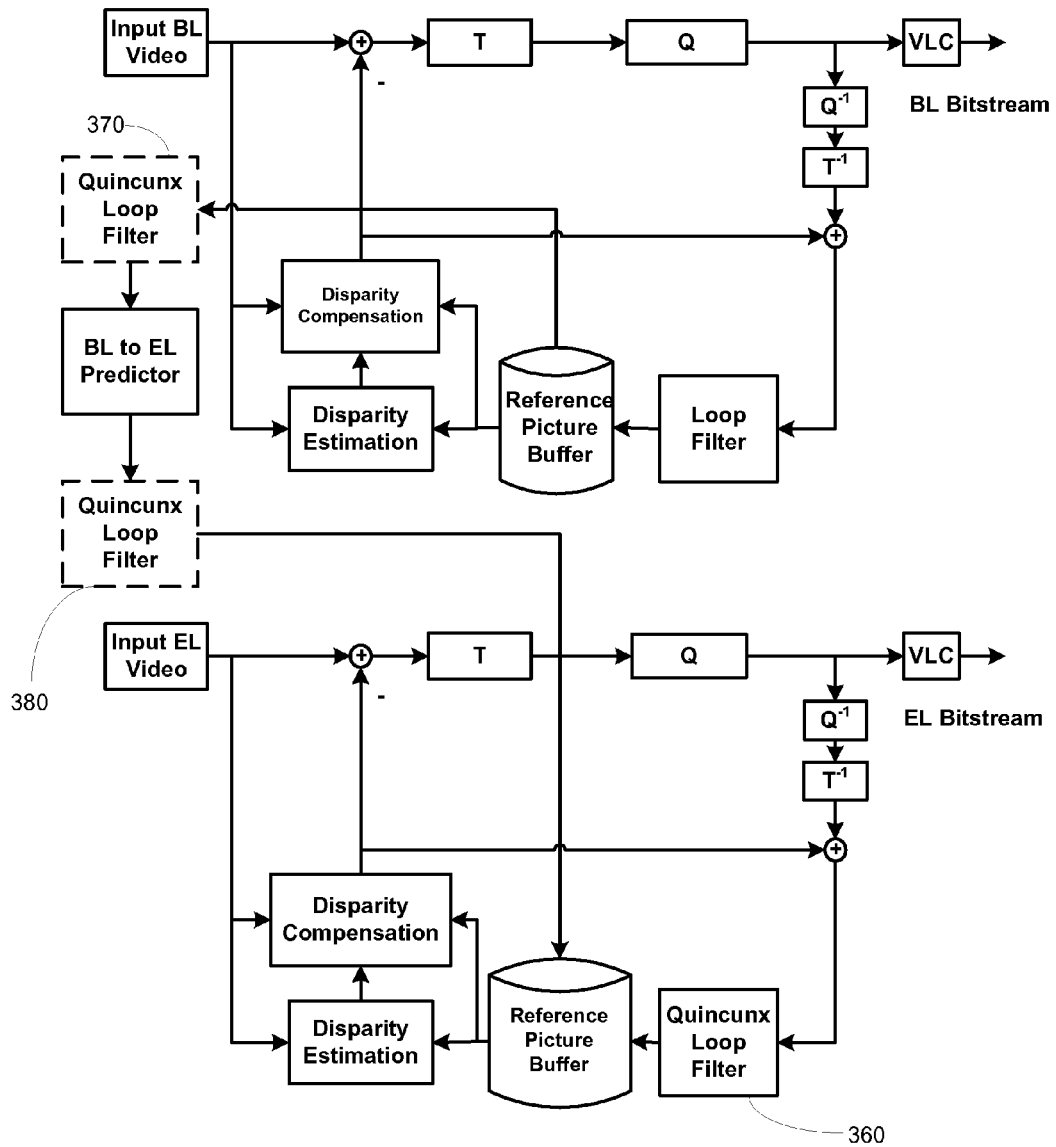
FIG. 30 shows an example of loop filtering for sampled data in a resolution-scalable 3D stereo video encoder.
Figure 31:
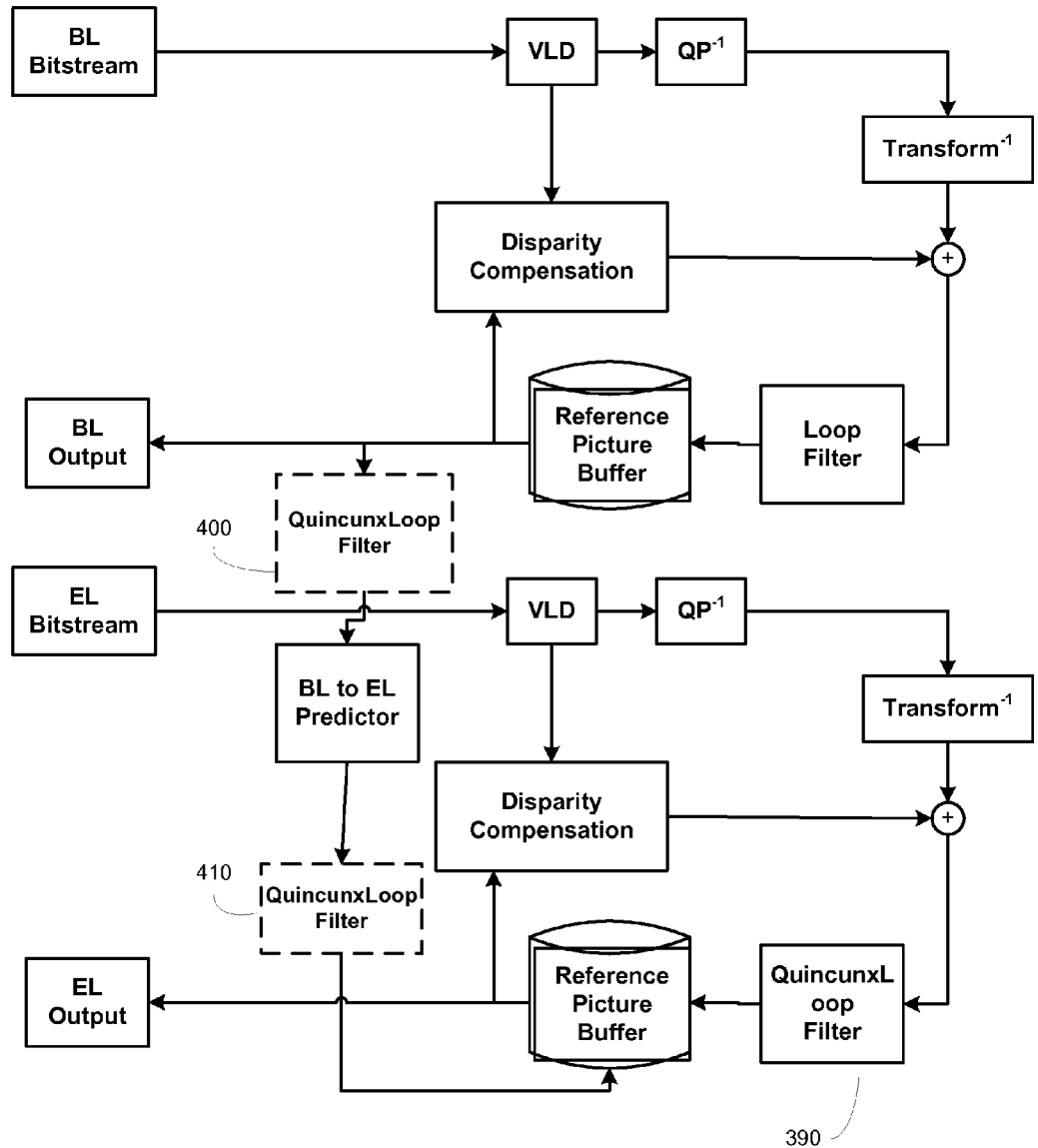
FIG. 31 shows an example of loop filtering for sampled video data in a resolution-scalable 3D stereo video decoder.

The enhancement layer may either contain the full resolution content or the samples not coded in the base layer. A diagram of a base and enhancement layer encoding and decoding system where quincunx-pattern sampling is used in the enhancement layer is shown in FIG. 30 and FIG. 31. The same diagram applies also for cases where spatial scalability for single view delivery is used. It is not constrained to the delivery of stereoscopic content. Furthermore, any of available sampling and interleaving strategies can be used. In the same figures Applicants illustrate the application of the in-loop filtering step (360, 390). Note that when the EL contains the full-resolution samples and the goal is 3D stereoscopic video delivery, then the EL frames contain both full-resolution views, e.g. side-by-side. The EL frames will thus be larger than the BL frames, which are multiplexed in one of possible arrangements (CB, side-by-side column, among others). Such an embodiment is possible using the SVC extension (Annex G) of H.264/MPEG-4 AVC and modifying the prediction and coding process of the EL. As shown in FIGS. 30 and 31, the methods according to the present disclosure (e.g. a quincunx loop filter) can be applied to the in-loop filter (360, 390) of one or more of the enhancement layers of the scalable video coding system. Moreover, such methods can also be applied before (370, 400) and/or after (380, 410) the base layer to enhancement layer predictor. The person skilled in the art will understand that the teachings of the present disclosure with reference to FIGS. 30 and 31 are applicable to content not limited to 3D CB. By way of example, they can also be applicable to any kind of 3D multiplexing such as side-by-side content. Additionally, one may use such a strategy to implement spatial scalability: the BL may code half the resolution of the original signal and the EL the other half (e.g. with column sub-sampling). Hence applications include also traditional 2D video delivery.

Figure 32:
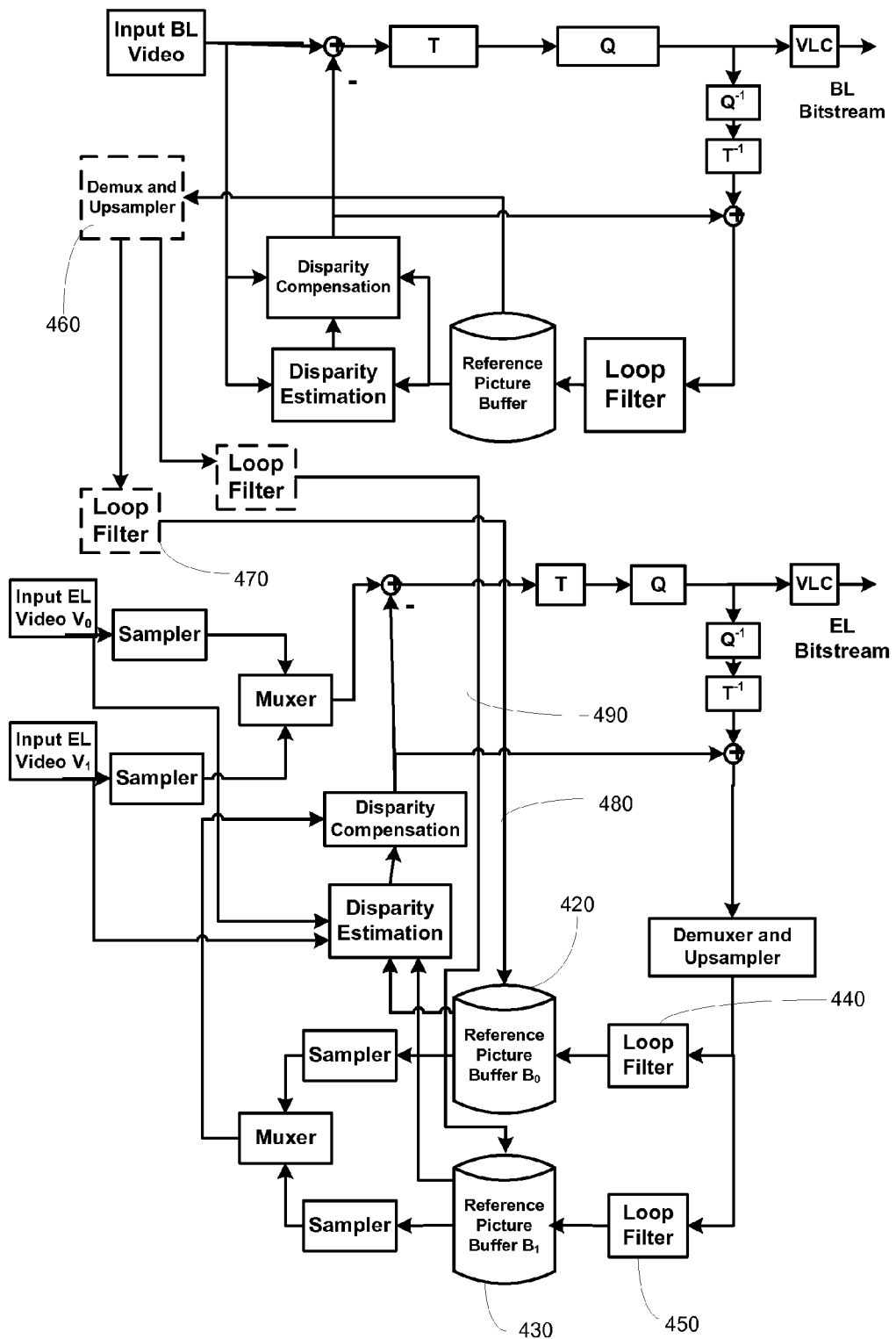
FIG. 32 shows an example of loop filtering for sampled video data in a resolution-scalable 3D stereo video encoder.
Figure 33:
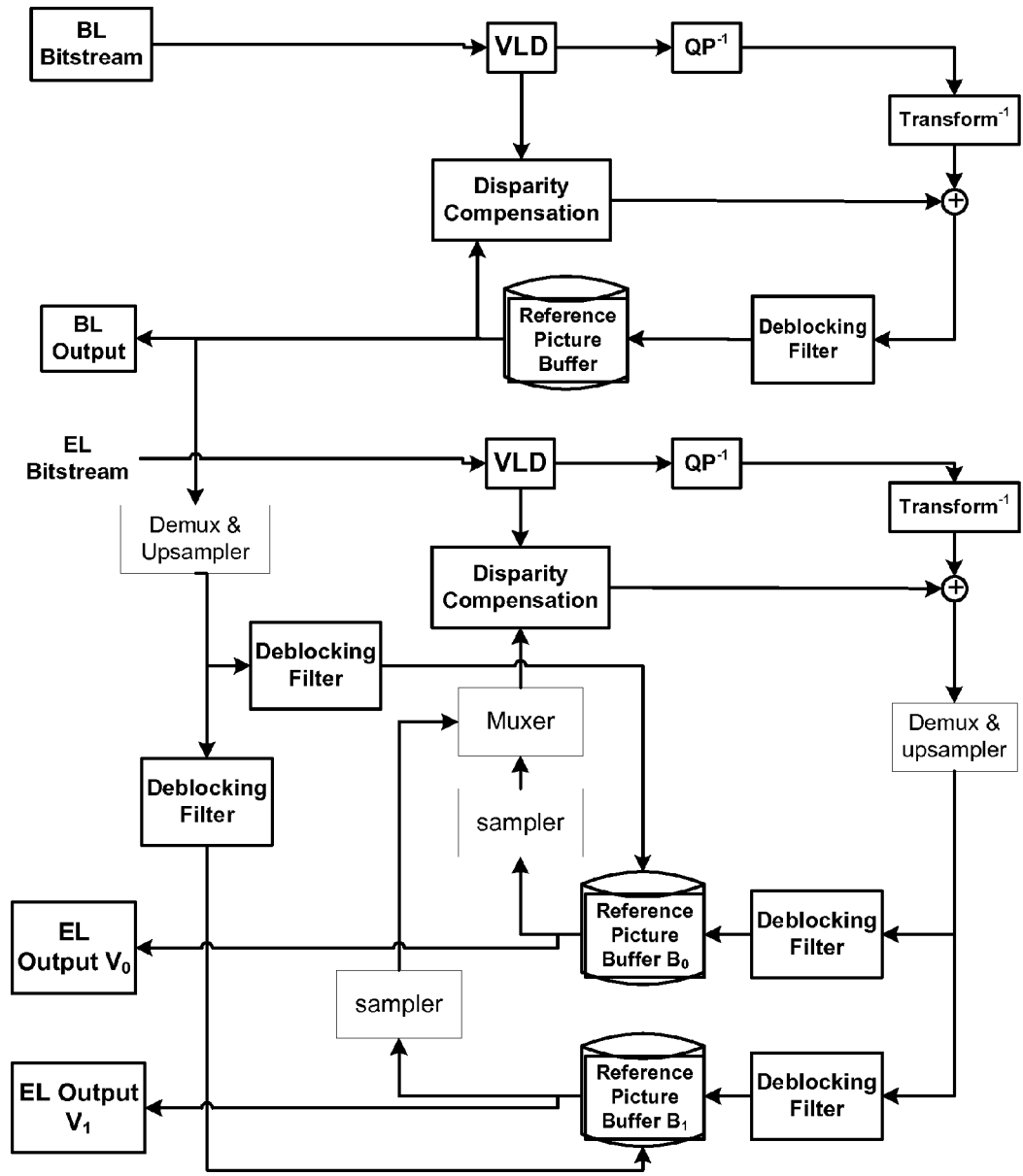
FIG. 33 shows an example of loop filtering for sampled video data in a resolution-scalable 3D stereo video decoder.

An additional embodiment is now described for resolution-scalable stereoscopic video coding. Deblocking can be an in-loop process for the base and the enhancement layer. In such embodiment, differently from the system above, two separate internal reference picture buffers (420, 430) are maintained for each view in the enhancement layer. Each separate buffer receives inputs from loop filters (440, 450), such as deblocking filters. The prediction signal from the base layer to the enhancement layer though is derived by sampling and interleaving the stored views. This architecture comprises several sampling, multiplexing and de-multiplexing steps. See, in particular, the boxes 'Demux and Upsampler' (460) and 'Loop Filter' (470) represented with dotted lines along the path of the prediction signal (480, 490). As a result these steps could in some additional embodiment be combined together as already discussed in section (c) above. The encoder for such a system is shown in FIG. 32 and the decoder in FIG. 33.

Figure 34:
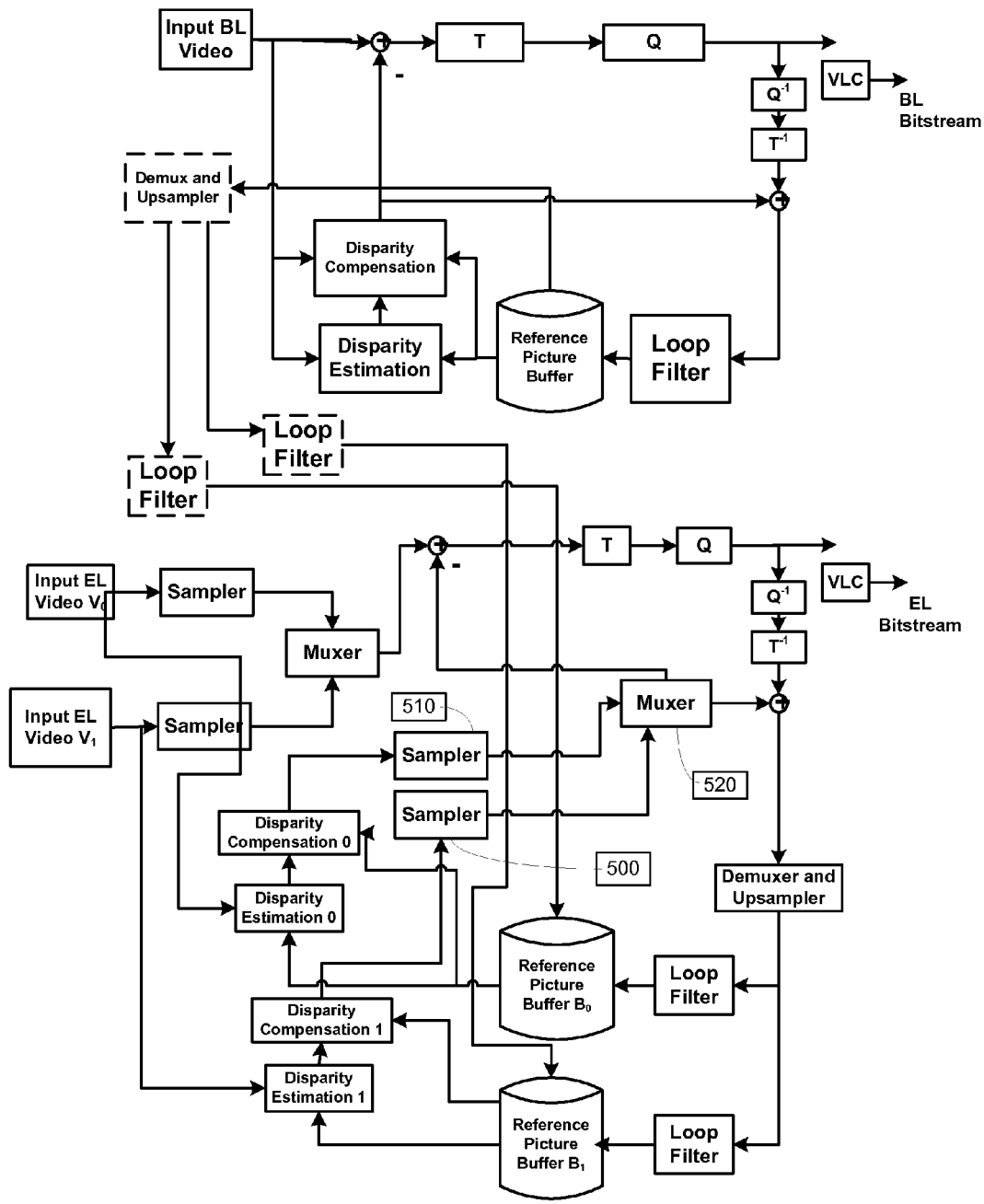
FIG. 34 shows an example of loop filtering for sampled video data in a resolution-scalable 3D stereo video encoder.
Figure 35:
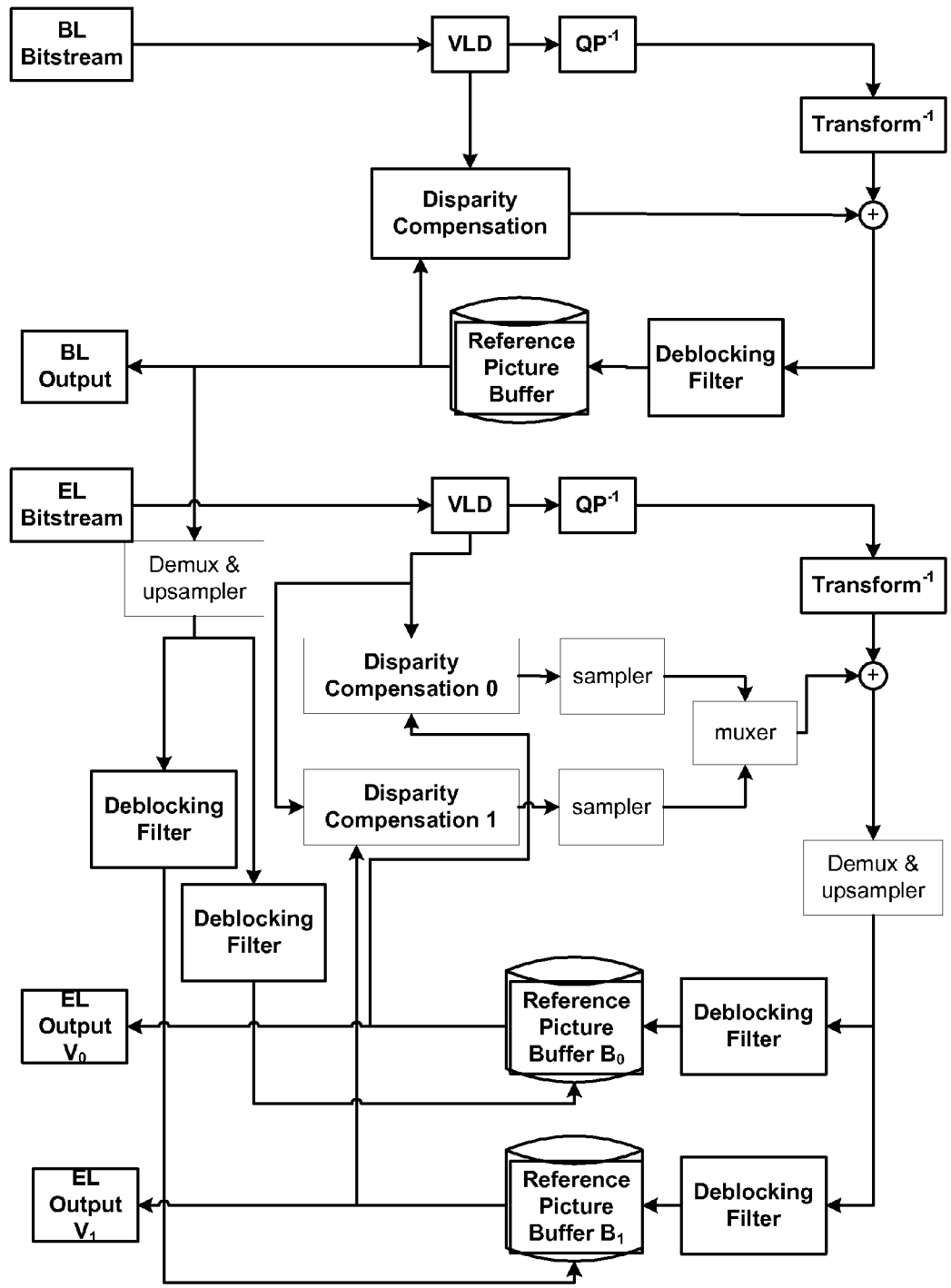
FIG. 35 shows an example of loop filtering for sampled video data in a resolution-scalable 3D stereo video decoder.

An additional system, whose encoder and decoder are shown in FIG. 34 and FIG. 35, still maintains two separate picture buffers and performs prediction in the full resolution domain followed by sampling of the predicted views. Loop filtering (e.g. deblocking) may be applied at the enhancement layer and during prediction of the enhancement layer pictures from those of the base layer. In particular, one or more of the one or more enhancement layers of FIG. 34 (encoding side) and FIG. 35 (decoding side) comprises two samplers (500, 510) and a muxer (520), among other components. In another embodiment of the present disclosure, the enhancement layer, on either the encoding side or the decoding side, does not use samplers. Therefore, while the system of FIGS. 32/33 sub-samples and multiplexes the frames to create a single frame that is then used to predict the sampled frame, in the system of FIGS. 34/35 the full resolution frames are used without multiplexing or subsampling to predict full resolution input frames.

Figure 40:
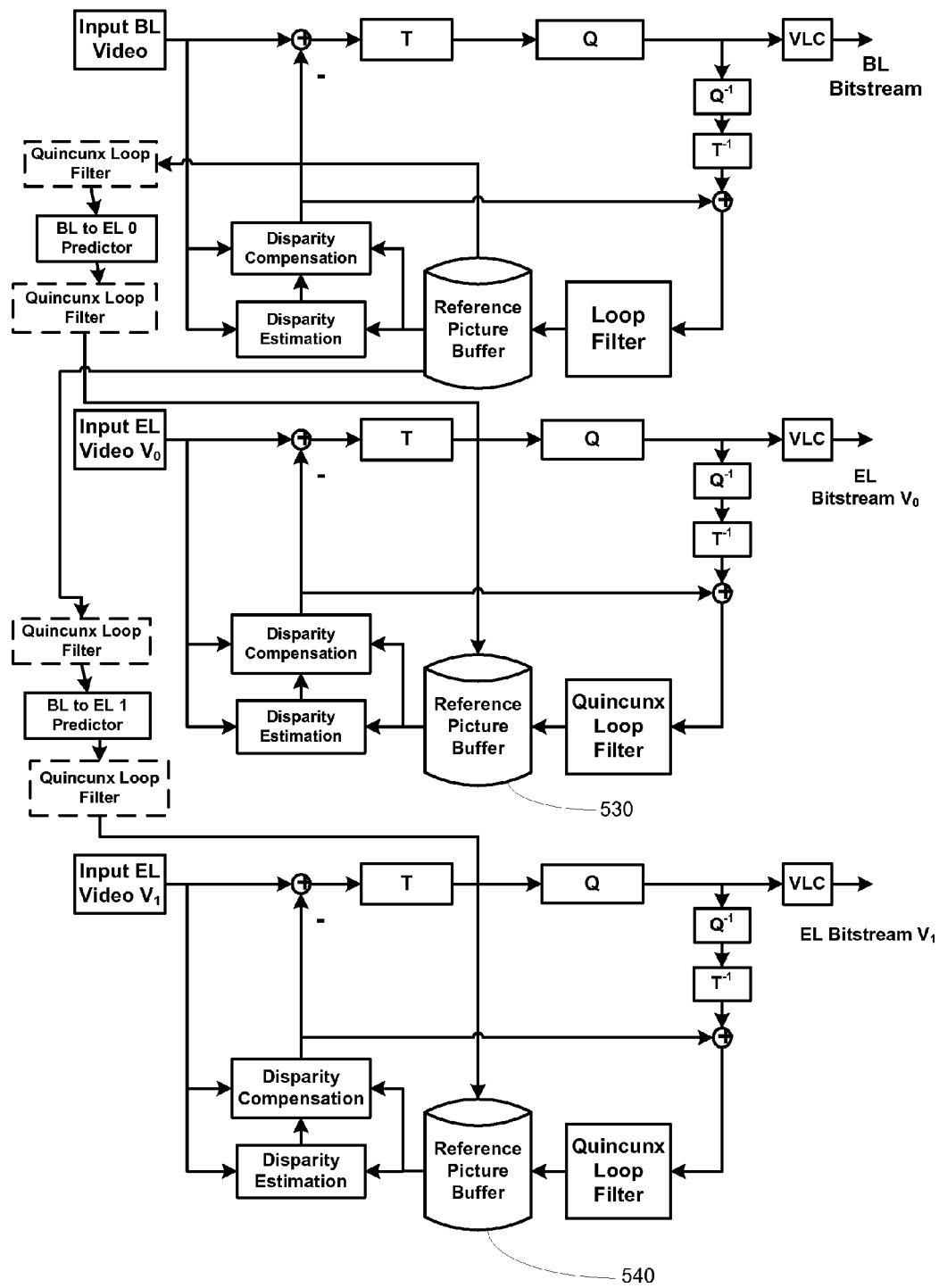
FIG. 40 shows an example of loop filtering for sampled data in a resolution-scalable video encoder with multiple enhancement layers.
Figure 41:
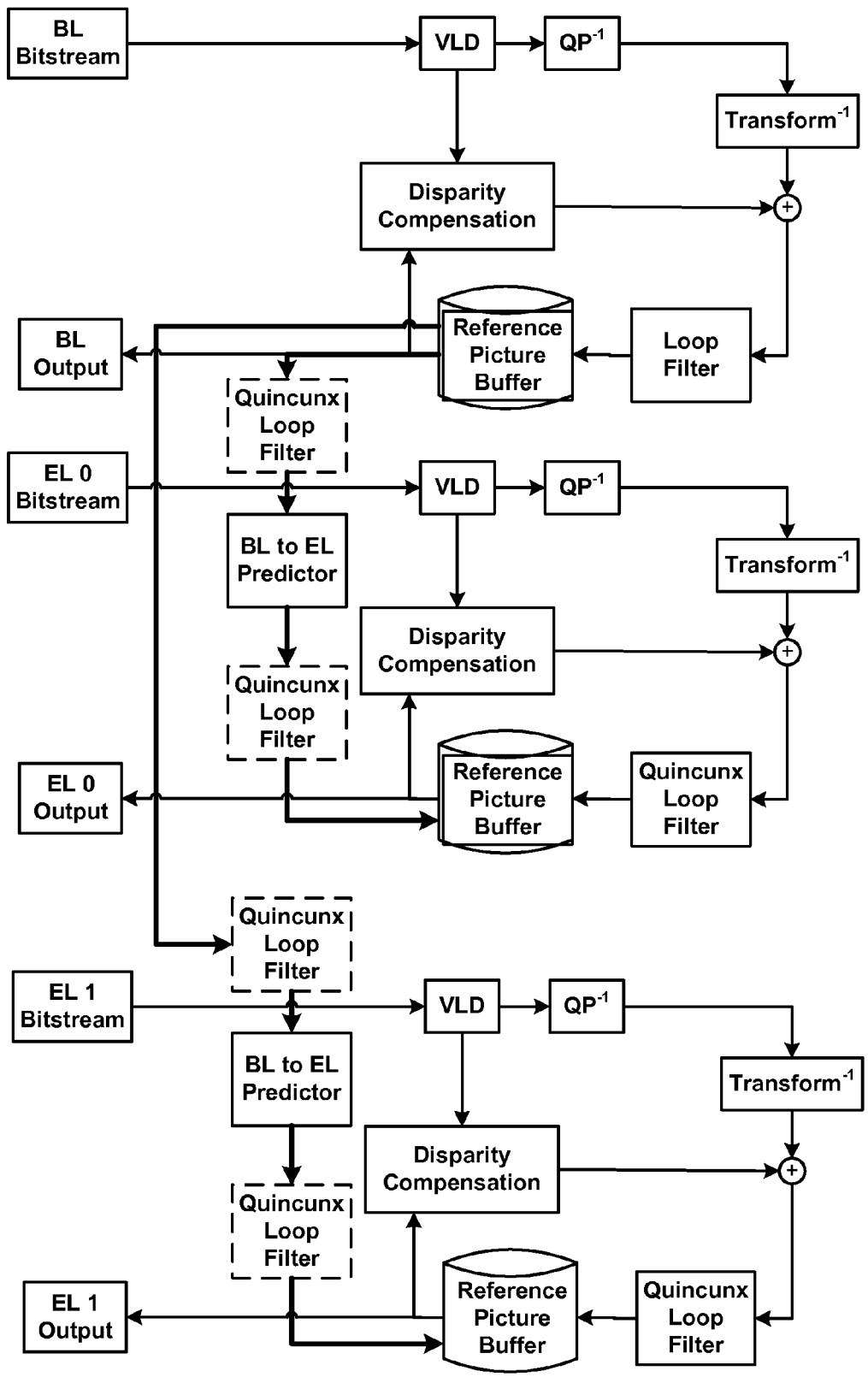
FIG. 41 shows an example of loop filtering for sampled video data in a resolution-scalable video decoder with multiple enhancement layers.

A further embodiment of the present disclosure, whose encoder and decoder are shown in FIG. 40 and FIG. 41, supports two separate enhancement layers, each having access to a single reference picture buffer (530, 540), and performs prediction in the full resolution domain. Each EL thus codes the full resolution version of each view. Loop filtering (e.g. deblocking) may be applied at the enhancement layer and during prediction of the enhancement layer pictures from those of the base layer.

Figure 36:
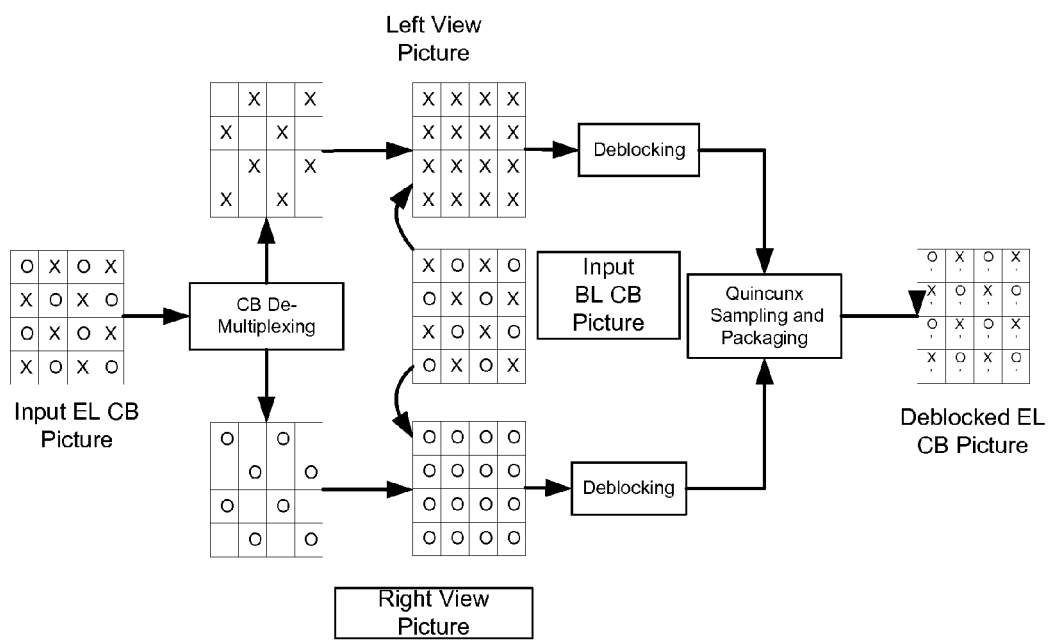
FIG. 36 shows an example of enhancement layer deblocking using samples from the base layer.

The deblocking step may have a different implementation depending on the nature and format of the data being coded in the enhancement layer. In one embodiment the enhancement layer codes the samples for each view that are not coded in the base layer representation (keeping in mind that the sampling process that is part of the generation of the base layer will result to coding fewer samples than the full-resolution samples). Subsequently, a combination of the samples coded in the base and the enhancement layer yields the full-resolution views. Deblocking in the base layer involves some kind of interpolation to recover the missing samples for optimal deblocking performance, as discussed earlier. Deblocking in the enhancement layer may also be implemented in the same way. However, embodiments can be provided where the missing samples are not interpolated in the enhancement layer but simply replaced with the ones from the base layer so that one has access to all full resolution samples prior to applying deblocking in the enhancement layer. This is shown in FIG. 36 for the exemplary case of quincunx sampling and interleaving. In this case, one can use either a traditional deblocking algorithm, if all samples are replaced, or one of the sampling-aware (e.g. quincunx-specific) algorithms described in the present disclosure if only sample values closest to the boundaries are used.

In another embodiment, the enhancement layer codes the full resolution left and right views using also a prediction from the base layer. In this case, deblocking in the enhancement layer may use any known deblocking algorithm designed for progressive or interlaced (including macroblock-based and picture-based interlaced coding as adopted in H.264) image or video data.

In a different embodiment, the schemes of FIG. 32 or 34 can be used to deliver interlaced content. Using the notation from the figure, the top field can be assigned to $V_0$ and the bottom field to $V_1$. The base layer may code either one of the two fields, a sub-sampled version of either one of the two fields, or a sub-sampled version of a combination of the two fields.

Figure 37:
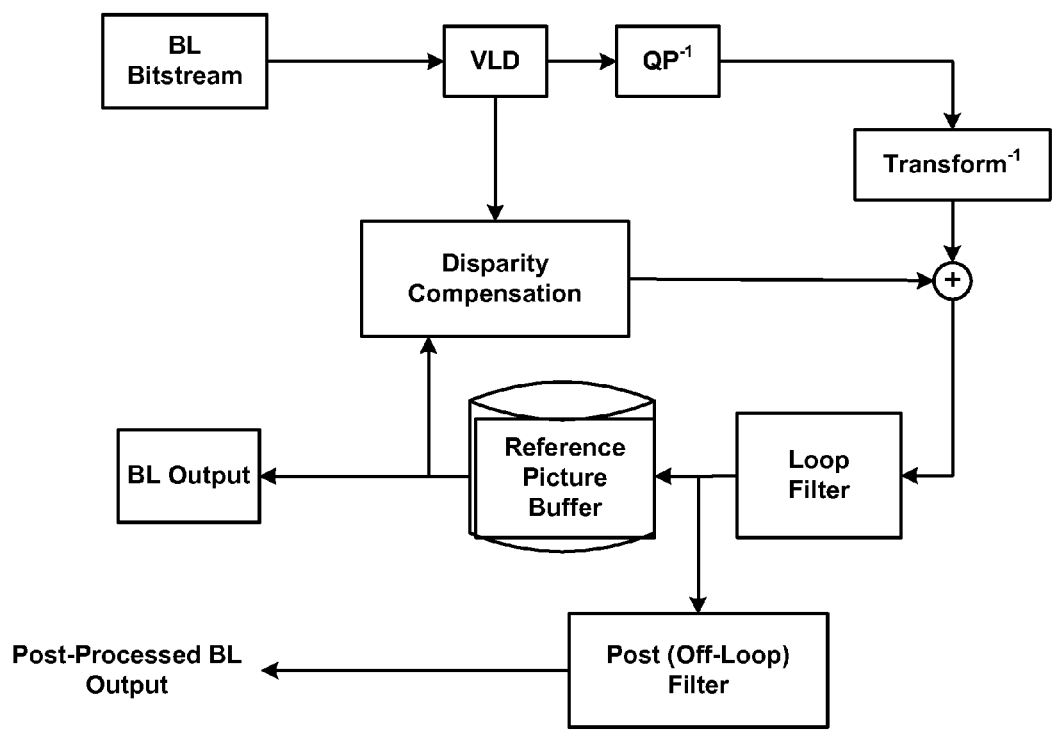
FIG. 37 shows an example of off-loop post-processing.

(d) Off-loop post-processing. The implementation may differ based on the final signal being at full resolution or in some sub-sampled (e.g. quincunx) pattern, and also on the type of the display. If the display expects the input to be in a sampled format (e.g. "CB") then one has two main options, apply post-processing directly on the, e.g. quincunx, samples domain or de-multiplex the two views to their full resolution, apply post-processing on the full resolution samples, and then resample the views sampled picture that will be fed to the display. If the display receives its input in a format different to that of CB, including, but not limited to, side-by-side format, line-by-line format, or full resolution views, one option is to perform deblocking in the sampled picture (e.g. CB domain) prior to de-multiplexing the content to one of the possible output formats. Another option is to perform post-processing as part of (jointly with) the de-multiplexing process as previously discussed in section (c) of the present disclosure. A general implementation is depicted in FIG. 37.

Figure 38:
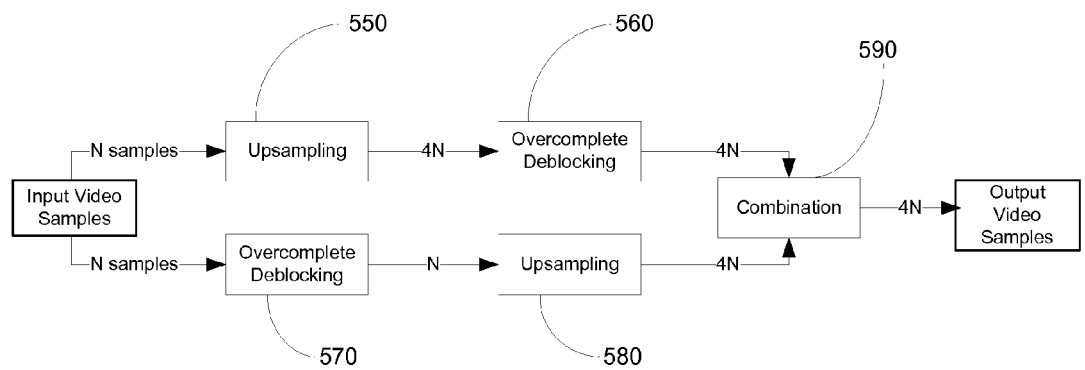
FIG. 38 shows a further example, where input video samples are separately processed in two distinct branches and then combined together.

FIG. 38 shows a further embodiment of the present disclosure, where joint processing (e.g., deblocking) and upsampling (e.g., by a factor of 2 for each dimension) occurs. As shown in FIG. 38, a set of N input video samples undergoes two distinct kinds of operations. In the upper branch of FIG. 38 upsampling (550) followed by overcomplete deblocking (560) occurs. In the lower branch, overcomplete deblocking (570) occurs first, followed by upsampling (580). The 4N samples processed in each branch are then combined together (590). Traditional overcomplete deblocking can be used for deblocking. Any upsampling operation may be used. According to the embodiment of FIG. 38, advantage is taken of overcomplete operations prior and after the upsampling operation. The samples from each branch are then combined either in the pixel (image) or the frequency domain. The combination may be linear (e.g., some weighted summation) but also non-linear: one of the two may be selected based on some metric or constraint or segmentation. For example textured areas may prefer one over the other compared to say smooth areas. Embodiments can also be provided where the frequency domain processing takes into consideration many different frequency decomposition domains where processing is performed in each of the domains and the domains are later combined. Although the embodiment of FIG. 38 has been shown with reference to overcomplete deblocking, it can also be used with other kinds of processing, such as denoising or filtering in general. Moreover, the input video samples of FIG. 38 can be any kind of video samples, not limited to samples of a composite picture.

Figure 39:
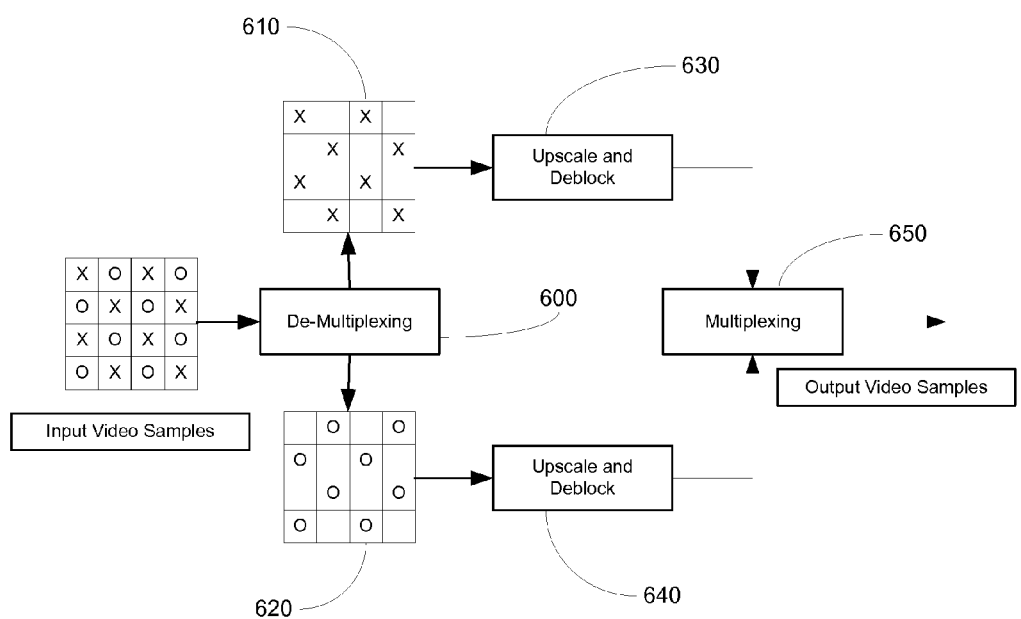
FIG. 39 shows a further example where speed up of processing operations is discussed.

The teachings of the present disclosure can be adopted to increase the computational speed of processing operations such as deblocking, denoising and filtering. FIG. 39 shows a schematic diagram, where, for example, in order to speed up deblocking, the full resolution samples are sampled with, e.g., a quincunx pattern, and then the composite video samples are demultiplexed (600) into component representations (610, 620) (e.g., "left" and "right" pictures, or any kind of content such as odd and even indexed samples) to perform deblocking (and optionally upsampling) (630, 640) on each component representation and then multiplex (650) each processed representation (through, e.g., a linear or nonlinear combination) to derive the full resolution deblocked picture.

In summary, according to several embodiments, the present disclosure considers data enhancement or processing systems and methods, such as in-loop (part of the encoding/decoding process) or out of loop (pre-processing or post-processing stage) processing, such as deblocking and denoising, for data that may have been sampled and multiplexed with a variety of methods. These systems and methods can be applied to existing codecs (encoders and decoders), but can also extend to future encoders and decoders by also providing modifications to core components. Applications could include Blu-ray video encoders and players, set-top boxes, software encoders and players but also broadcast and download solutions which are more bandwidth-constrained. Additional applications include BD video encoders, players, and video discs created in the appropriate format, or even content and systems targeted for other applications such as broadcast, satellite, and IPTV systems, etc.

The methods and systems described in the present disclosure may be implemented in hardware, software, firmware or combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), or a field programmable logic array (FPGA)).

Thus, an embodiment of the present invention may relate to one or more of the example embodiments described below.

Accordingly, the invention may be embodied in any of the forms described herein, including, but not limited to the following Enumerated Example Embodiments (EEEs) which described structure, features, and functionality of some portions of the present invention:

EEE1. A method to process composite sampled image or video data comprising multiplexed image or video data pertaining to a plurality of image or video components, comprising:
de-multiplexing the composite sampled image or video data into a plurality of component pictures;
separately processing each component picture; and
sampling and multiplexing the separately processed component pictures together.

EEE2. The method as described in relation to enumerated example embodiment 1, further comprising separately interpolating each component picture.

EEE3. The method as described in relation to enumerated example embodiment 1 or 2, wherein processing is selected from deblocking, denoising, deblurring, deringing and filtering.

EEE4. The method as described in relation to enumerated example embodiments 1 to 3, wherein the plurality of component pictures are a left component view and a right component view of three-dimensional (3D) stereoscopic image or video data.

EEE5. The method as described in relation to enumerated example embodiments 1 to 4, wherein the processing of each component picture is based on analysis of parameters pertaining to at least one of the composite sampled image or video data and the plurality of component pictures.

EEE6. The method as described in relation to enumerated example embodiment 5, wherein the parameters comprise one or more of estimation of stereo disparity, edge and frequency characteristics, average luminance values, temporal characteristics such as motion information, coding mode, intra prediction direction, energy of the residual, quantization parameters, average chrominance values, and information from a base layer if the component picture is coded in an enhancement layer.

EEE7. A method to process composite sampled image or video data comprising multiplexed image or video data pertaining to a plurality of image or video components or categories, comprising:
processing each element of the composite sampled image or video data by taking into account the image or video component or category to which said each element pertains, thus differentiating between processing of composite data pertaining to one image or video component or category and processing of composite data pertaining to another image or video component or category.

EEE8. The method as described in relation to enumerated example embodiment 7, wherein knowledge of a particular image or video component or category to which each element of the composite sampled image or video data pertains is provided when sampling the composite image or video data together.

EEE9. The method as described in relation to enumerated example embodiment 8, wherein the knowledge includes spatial relationship between data in the composite image or video and/or spatial relationship between the data in the image or video component or category.

EEE10. The method as described in relation to enumerated example embodiments 7 to 9, wherein the processing comprises interpolation.

EEE11. The method as described in relation to enumerated example embodiment 10, wherein the interpolation is partially performed, fully performed or not performed.

EEE12. The method as described in relation to enumerated example embodiment 11, wherein the processing comprises deblocking and wherein decision as to whether to perform interpolation or not to perform interpolation on data depends on a distance of the data from a block edge.

EEE13. The method as described in relation to enumerated example embodiments 10 to 12, wherein interpolation is selected from bilinear filtering, edge-adaptive filtering, separable filtering, non-separable filtering, and prediction from past and/or future pictures.

EEE14. The method one as described in relation to enumerated example embodiments 7 to 13, wherein processing comprises deblocking, denoising, deblurring, deringing or filtering.

EEE15. The method as described in relation to enumerated example embodiments 7 to 14, wherein differentiation between processing of data pertaining to different components or categories occurs by assigning different weights to the data pertaining to the different components or categories.

EEE16. The method as described in relation to enumerated example embodiments 7 to 14, wherein differentiation between processing of data pertaining to different components or categories occurs through a similarity measure between the data pertaining to one component or category and the data pertaining to another component or category.

EEE17. The method as described in relation to enumerated example embodiment 7, wherein processing comprises deblocking of data pertaining to a separate image or component preceded by interpolation of block edge data pertaining to said separate image or component.

EEE18. The method as described in relation to enumerated example embodiment 17, further comprising adjusting deblocking filter values in accordance with a distance from the block edge in the image or component picture.

EEE19. The method as described in relation to enumerated example embodiment 7, wherein the processing comprises filtering, and wherein the filtering differentiates between the one video component or category and the another video component or category by providing different filter weights.

EEE20. The method as described in relation to enumerated example embodiment 19, wherein the different filter weights correspond to different sampling ratios, patterns and/or orientations between the data of the one video component or category and the data of the another video component or category.

EEE21. The method as described in relation to enumerated example embodiment 19 or 20, wherein the processing further comprises interpolation.

EEE22. The method as described in relation to enumerated example embodiment 7, wherein the composite sampled image or video data are arranged along a rectangular grid and wherein the processing occurs along a non-horizontal and non-vertical direction.

EEE23. The method as described in relation to enumerated example embodiment 22, wherein the direction comprises a diagonal direction.

EEE24. The method as described in relation to enumerated example embodiment 22 or 23, wherein the processing proceeds according to fixed or signaled parameters.

EEE25. The method as described in relation to enumerated example embodiments 22 to 24, wherein the processing is selected from deblocking, denoising, deblurring, deringing and filtering.

EEE26. The method as described in relation to enumerated example embodiments 22 to 24, wherein the processing is preceded by pre-analysis, to determine orientation and/or spatial characteristics of the image or video data.

EEE27. The method as described in relation to enumerated example embodiment 7, wherein the composite sampled image or video data are processed for motion compensated prediction to obtain a prediction block from a current block, and wherein the prediction block is obtained by considering, for each sampled data position in the current block, samples in a motion-compensated reference that belong to the same category as that of the sampled data position.

EEE28. A method to process composite sampled image or video data comprising multiplexed image or video data pertaining to a plurality of image or video components, comprising:
de-multiplexing the composite sampled image or video data into a plurality of component pictures while at the same time processing the sampled image or video data, wherein processing is selected from deblocking, denoising, deblurring, deringing, and filtering.

EEE29. The method as described in relation to enumerated example embodiment 28, wherein the de-multiplexing and the same time processing occurs through a weighted interpolation, where different weights are applied to different neighboring samples.

EEE30. The method as described in relation to enumerated example embodiment 29, wherein the processing is deblocking and the neighboring samples to be used for interpolation are located on both sides of a block edge, and wherein a first weight comprises applied to neighboring samples on one side of the block edge and a second weight comprises applied to neighboring samples on another side of the block edge.

EEE31. The method as described in relation to enumerated example embodiment 30, wherein the first weight is higher than the second weight when the neighboring samples on the one side are less than the neighboring samples on the other side.

EEE32. The method as described in relation to enumerated example embodiments 29 to 31, wherein the weights depend on parameters selected from quantization parameters of neighboring blocks, coding modes and motion parameters of the blocks, and spatial characteristics of the image or video.

EEE33. The method as described in relation to enumerated example embodiments 29 to 32, wherein the weights are calculated prior to processing.

EEE34. A method to process composite sampled image or video data comprising multiplexed image or video data pertaining to a plurality of image or video categories, comprising:
providing an initial block of existing samples of the same category;
applying a transform to the samples of the initial block;
using transform coefficients of the initial block to estimate transform coefficients of a double-sized block containing the same existing samples of the initial block and missing samples of the same category of the existing samples;
adjusting the estimated transform coefficients of the other double-sized block; and
applying an inverse transform to the samples of the double-sized block.

EEE35. A method to process image or video data, comprising:
separately pre-processing image or video components of an image or video to be interleaved or multiplexed;
separately sampling the pre-processed image or video components;
interleaving or multiplexing the sampled pre-processed image or video components, thus forming a composite image or video; and
processing the composite image or video.

EEE36. The method as described in relation to enumerated example embodiment 35, wherein processing the composite image or video is selected from deblocking, denoising, deblurring, deringing, and filtering the composite image or video.

EEE37. The method as described in relation to enumerated example embodiment 35 or 36, wherein processing the composite image or video is based on motion information taken from the image or video components during pre-processing.

EEE38. The method one as described in relation to enumerated example embodiments 1 to 37, wherein said method is for processing the image or video data prior to coding.

EEE39. The method one as described in relation to enumerated example embodiments 1 to 37, wherein said method is for processing the image or video data after coding.

EEE40. The method one as described in relation to enumerated example embodiments 1 to 37, wherein said method is for processing the image or video data while encoding the image or video data.

EEE41. The method one as described in relation to enumerated example embodiments 1 to 37, wherein said method is for processing the image or video data while decoding the image or video data.

EEE42. The method according to enumerated example embodiment 40, wherein said method is for processing the multiplexed image or video data of a scalable video coding system comprised of a base layer and one or more enhancement layers, said method being applied to the in-loop filter of one or more of the one or more enhancement layers on the encoder side.

EEE43. The method according to enumerated example embodiment 42, wherein the scalable video coding system comprises on the encoder side a base layer to enhancement layer predictor, said method being further applied before and/or after the base layer to enhancement layer predictor.

EEE44. The method according to enumerated example embodiment 41, wherein said method is for processing the multiplexed image or video data of a scalable video coding system comprised of a base layer and one or more enhancement layers, said method being applied to the in-loop filter of one or more of the one or more enhancement layers on the decoder side.

EEE45. The method according to enumerated example embodiment 44, wherein the scalable video coding system comprises on the decoder side a base layer to enhancement layer predictor, said method being further applied off-loop before and/or after the base layer to enhancement layer predictor.

EEE46. The method according to enumerated example embodiment 40, wherein said method is for processing the multiplexed image or video data of a scalable video coding system comprised of a base layer and one or more enhancement layers, wherein at least one of the one or more enhancement layers comprises on the encoder side a plurality of in-loop dedicated reference picture buffers, one for each image or video component of the multiplexed image or video data.

EEE47. The method according to enumerated example embodiment 46, wherein the scalable video coding system comprises on the encoder side a prediction signal path between the base layer and one or more of the one or more enhancement layers, the prediction signal path comprising a demultiplexer and upsampler and/or a loop filter between a reference picture buffer of the base layer and each dedicated reference picture buffer of the one or more enhancement layers.

EEE48. The method according to enumerated example embodiment 47, wherein the multiplexer and upsampler and the loop filter of the prediction signal block are combined together.

EEE49. The method according to enumerated example embodiment 41, wherein said method is for processing the multiplexed image or video data of a scalable video coding system comprised of a base layer and one or more enhancement layers, wherein at least one of the one or more enhancement layers comprises on the decoder side a plurality of in-loop dedicated reference picture buffers, one for each image or video component of the multiplexed image or video data.

EEE50. The method according to enumerated example embodiment 49, wherein the scalable video coding system comprises on the decoder side a prediction signal path between the base layer and one or more of the one or more enhancement layers, the prediction signal path comprising a demultiplexer and upsampler and/or a loop filter between a reference picture buffer of the base layer and each dedicated reference picture buffer of the one or more enhancement layers.

EEE51. The method according to enumerated example embodiment 47, wherein the multiplexer and upsampler and the loop filter of the prediction signal block are combined together.

EEE52. The method one as described in relation to enumerated example embodiments 46-51, wherein said video content is interlaced video content.

EEE53. A method to process composite sampled image or video data of a scalable video coding system having a base layer and one or more enhancement layers, the composite sampled image or video data comprising multiplexed image or video data pertaining to a plurality of image or video components, the method comprising:

de-multiplexing the composite sampled image or video data of one or more of the one or more enhancement layers into a plurality of enhancement layer component pictures;

replacing missing samples of each enhancement layer component picture with samples from the base layer;

separately processing each enhancement layer component picture after replacement; and sampling and multiplexing the separately processed enhancement layer component pictures together.

EEE54. A method to process composite sampled image or video data of a scalable video coding system having a base layer and one or more enhancement layers, the composite sampled image or video data comprising multiplexed image or video data pertaining to a plurality of image or video components, the method comprising:

de-multiplexing the composite sampled image or video data of one or more of the one or more enhancement layers into a plurality of enhancement layer component pictures;

separately coding each enhancement layer component picture using a prediction from the base layer;

separately processing each coded enhancement layer component picture; and sampling and multiplexing the separately processed component pictures together.

EEE55. The method as described in relation to enumerated example embodiment 54 wherein the processing step comprises a deblocking step.

EEE56. The method according to enumerated example embodiment 41, wherein said method is for processing the multiplexed image or video data of a scalable video coding system comprised of a base layer and one or more enhancement layers, said method being applied as a post-processing filter of the base layer on the decoder side.

EEE57. A method for processing video samples of an image, comprising:

performing two separate sets of operations on the video samples, the first set of operations comprising upsampling the video samples followed by processing the upsampled video samples to provide a first output, and the second set of operations comprising processing the video samples followed by upsampling the processed video samples to provide a second output; and combining the first output with the second output.

EEE58. The method as described in relation to enumerated example embodiment 57, wherein the processing is deblocking, denoising, deblurring, deringing, or filtering.

EEE59. The method as described in relation to enumerated example embodiment 58, wherein the deblocking comprises overcomplete deblocking.

EEE60. The method as described in relation to enumerated example embodiment 58 or 59, wherein the combining is performed through a linear and/or nonlinear combination in an image and/or frequency domain.

EEE61. The method as described in relation to enumerated example embodiment 60, wherein frequency domain processing includes consideration of different frequency decomposition domains where processing is performed in each of the domains and the domains are later combined.

EEE62. A method to increase computational speed of a processing operation on samples of a composite image or video arrangement, comprising:

de-multiplexing the samples of the composite image or video arrangement into separate samples of components forming the composite image or video arrangement;

separately processing each component; and multiplexing the separately processed components together.

EEE63. The method as described in relation to enumerated example embodiment 62, wherein processing is selected from deblocking, denoising, deblurring, deringing, and filtering.

EEE64. An encoder for encoding a video signal according to the method as described in relation to one or more of enumerated example embodiments 1-37, 42-43, or 46-48, inclusive.

EEE65. An apparatus for encoding a video signal according to the method as described in relation to one or more of enumerated example embodiments 1-37, 42-43, or 46-48, inclusive.

EEE66. A system for encoding a video signal according to the method as described in relation to enumerated example embodiments 1-37, 42-43, or 46-48, inclusive.

EEE67. A decoder for decoding a video signal according to the method as described in relation to one or more of enumerated example embodiments 1-37, 44-45, 49-51, or 56, inclusive.

EEE68. An apparatus for decoding a video signal according to the method as described in relation to one or more of enumerated example embodiments 1-37, 44-45, 49-51, or 56, inclusive.

EEE69. A system for encoding a video signal according to the method as described in relation to enumerated example embodiments 1-37, 44-45, 49-51, or 56, inclusive.

EEE70. A computer-readable medium containing a set of instructions that causes a computer to perform the method as described in relation to enumerated example embodiments 1-62, inclusive.

EEE71. Use of the method as described in relation to one or more of enumerated example embodiments 1-37, 42-43, or 46-48, inclusive, to encode a video signal.

EEE72. Use of the method as described in relation to enumerated example embodiments 1-37, 44-45, 49-51, or 56, inclusive, to decode a video signal.

All patents and publications mentioned in the specification may be indicative of the levels of skill of those skilled in the art to which the disclosure pertains. All references cited in this disclosure are incorporated by reference to the same extent as if each reference had been incorporated by reference in its entirety individually. It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The examples set forth above are provided to give those of ordinary skill in the art a complete disclosure and description of how to make and use the embodiments of the enhancement methods for sampled and multiplexed image and video data of the disclosure, and are not intended to limit the scope of what the inventors regard as their disclosure. Modifications of the above-described modes for carrying out the disclosure may be used by persons of skill in the video art, and are intended to be within the scope of the following claims.

A number of embodiments of the disclosure have been described. Nevertheless, it will be understood that various modifications may be made without departing from the spirit and scope of the present disclosure. Accordingly, other embodiments are within the scope of the following claims.

LIST OF REFERENCES

[1] D. C. Hutchison, "Introducing DLP 3-D TV", http://www.dlp.com/downloads/Introducing DLP 3D HDTV Whitepaper.pdf

[2] M. D. McCormick, H. W. Neal, and D. C. Hutchison, "Implementation of Stereoscopic and Dualview Images on a Microdisplay High Definition Television," 3DTV-CON '08, Istanbul, Turkey, May 2008, pp. 33-36.

[3] A. Tourapis, W. Husak, A. Leontaris, D. Ruhoff, "Encoder Optimization of Stereoscopic Video Delivery Systems," U.S. Provisional Application 61/082,220 filed on Jul. 20, 2008.

[4] Advanced video coding for generic audiovisual services, http://www.itu.int/rec/recommendation.asp?type=folders&lang=e&parent=T-REC-H.264, March 2009.

[5] SMPTE 421M, "VC-1 Compressed Video Bitstream Format and Decoding Process", April 2006.

[6] A. Tourapis, A. Leontaris, and P. Pahalawatta, "Encoding and Decoding Architecture of Checkerboard Multiplexed Image Data," PCT Patent Application PCT/US2009/056940 filed on Sep. 15, 2009.

[7] P. Pahalawatta, A. Tourapis, and A. Leontaris, "Reconstruction Of De-Interleaved Views, Using Adaptive Interpolation Based On Disparity Between The Views For Up-Sampling," PCT Patent Application PCT/US2009/069132 filed on Dec. 22, 2009.

[8] A. Tourapis, W. Husak, P. Pahalawatta, and A. Leontaris, "Codecs And Devices For Interleaved And/Or Multiplexed Image Data," PCT Patent Application PCT/US2010/022445 filed on Jan. 28, 2010.

[9] A. Tourapis, A. Leontaris, P. Pahalawatta, and K. Stec, "Directed Interpolation And Data Post-processing," PCT Patent Application PCT/US2010/031762 filed on Apr. 20, 2010.

[10] O. G. Guleryuz, "A nonlinear loop filter for quantization noise removal in hybrid video compression," in Proc. Int. Conference on Image Processing, vol. 2, pp. 333-336, September 2005.

[11] O. G. Guleryuz, "Iterated Denoising for Image Recovery," in Proc. Data Compression Conference, Snowbird, Utah, April 2002.

What is claimed is:

1. A method to process composite sampled image or video data comprising multiplexed image or video data pertaining to a plurality of image or video components, comprising:
de-multiplexing the composite sampled image or video data into a plurality of component pictures;
processing each component picture separately from other component pictures of the plurality of component pictures; and
sampling and multiplexing the separately processed component pictures together;
wherein said processing each component picture separately from other component pictures is carried out simultaneously for the plurality of component pictures.

2. A method to process composite sampled image or video data comprising multiplexed image or video data pertaining to a plurality of image or video components or categories, comprising:
de-multiplexing the composite sampled image or video data into elements; and
processing each element of the composite sampled image or video data by taking into account the image or video component or category to which said each element pertains, thus differentiating between processing of composite data pertaining to one image or video component or category and processing of composite data pertaining to another image or video component or category, wherein said processing of composite data pertaining to one image or video component or category is performed separately from other composite data pertaining to another image or video component or category and is carried out simultaneously for the plurality of image or video components or categories.

3. A method to process composite sampled image or video data comprising multiplexed image or video data pertaining to a plurality of image or video components, comprising:

de-multiplexing the composite sampled image or video data into a plurality of component pictures while at the same time processing the sampled image or video data, wherein processing is selected from deblocking, denoising, deblurring, deringing, and filtering, and processing each component picture of the plurality of component pictures separately from other component pictures simultaneously for the plurality of image or video data.

4. The method according to claim 1, further comprising:

providing an initial block of existing samples of a same category;

applying a transform to samples of the initial block;

using transform coefficients of the initial block to estimate transform coefficients of a double-sized block containing the same existing samples of the initial block and missing samples of the same category of the existing samples;

adjusting the estimated transform coefficients of the other double-sized block; and applying an inverse transform to the samples of the double-sized block.

5. A method to process image or video data, comprising:

pre-processing image or video components of an image or video to be interleaved or multiplexed, separately from other image or video components of the image or video;

sampling the pre-processed image or video components, separately from other image or video components of the image or video;

interleaving or multiplexing the sampled pre-processed image or video components, thus forming a composite image or video; and processing the composite image or video;

wherein said pre-processing image or video components processes each image or video component of the image or video to be interleaved or multiplexed separately from other image or video components of the image or video to be interleaved or multiplexed is carried out simultaneously for the each image or video component and the other image or video components.

6. A method to process composite sampled image or video data of a scalable video coding system having a base layer and one or more enhancement layers, the composite sampled image or video data comprising multiplexed image or video data pertaining to a plurality of image or video components, the method comprising:

de-multiplexing the composite sampled image or video data of one or more of the one or more enhancement layers into a plurality of enhancement layer component pictures;

replacing missing samples of each enhancement layer component picture with samples from the base layer;

processing each enhancement layer component picture after replacement, separately from other enhancement layer component pictures of the same enhancement layer; and sampling and multiplexing the separately processed enhancement layer component pictures together;

wherein the processing each enhancement layer component picture is carried out simultaneously for all enhancement layer component pictures.

7. A method to process composite sampled image or video data of a scalable video coding system having a base layer and one or more enhancement layers, the composite sampled image or video data comprising multiplexed image or video data pertaining to a plurality of image or video components, the method comprising:

de-multiplexing the composite sampled image or video data of one or more of the one or more enhancement layers into a plurality of enhancement layer component pictures;

separately coding each enhancement layer component picture using a prediction from the base layer;

processing each coded enhancement layer component picture, separately from other coded enhancement layer component pictures of the same enhancement layer; and sampling and multiplexing the separately processed component pictures together;

wherein the processing each coded enhancement layer component picture is carried out simultaneously for all coded enhancement layer component pictures.

8. The method according to claim 1, further comprising:

performing two separate sets of operations on video samples from the sampling, the first set of operations comprising upsampling the video samples followed by processing the upsampled video samples to provide a first output, and the second set of operations comprising processing the video samples followed by upsampling the processed video samples to provide a second output; and combining the first output with the second output.

9. A method to increase computational speed of a processing operation on samples of a composite image or video arrangement, comprising:

de-multiplexing the samples of the composite image or video arrangement into separate components forming the composite image or video arrangement;

processing each component, separately from other components of the same sample; and multiplexing the separately processed components together;

wherein the processing each component is carried out simultaneously with processing of the other components.

10. A video encoder, comprising:

at least one processor; and a computer readable storage medium comprising instructions that are tangibly stored therewith, wherein the instructions:

cause, control, program or configure the processor to perform, execute, or control one or more of the process steps as recited claim 7; and output a correspondingly encoded video signal.

11. A video decoder, comprising:

at least one processor; and a computer readable storage medium comprising instructions that are tangibly stored therewith, wherein the instructions:

cause, control, program or configure the processor to perform, execute, or control one or more of the process steps as recited in relation to claim 7; or decode an encoded input video signal, wherein the encoded input video signal comprises the video signal output of the video encoder, as recited in claim 10.

12. The method according to claim 1, wherein the composite sampled image comprises a 3D video.

13. The method according to claim 2, wherein the composite sampled image or video data comprises 3D stereo paired imagery.

14. The method according to claim 3, wherein the plurality of component pictures comprises left and right views of 3D images.

15. The method according to claim 4, wherein the multiplexed image or video data comprises frame interleaved 3D video data.

16. The method according to claim 4, wherein the multiplexed image or video comprises video frames encoded in at least one of a side-by-side, over under, quincunx, line interleaved, row interleaved, and a mixed format encoding.

17. The method according to claim 6, further comprising a step of in-loop deblocking to suppress these artifacts.

18. The decoder according to claim 12, further comprising a deblocking unit configured to reduce artifacts in the decoded video signal.

19. The decoder according to claim 12, wherein the decoder is installed in a set-top box.

20. The decoder according to claim 12, wherein the input video signal comprises an internet based signal or IPTV signal.

21. The decoder according to claim 12, wherein the decoder is installed in a display.

22. The method according to claim 1, wherein the de-multiplexing and the processing are carried out simultaneously.

23. The method according to claim 7 wherein the de-multiplexing and the processing are carried out simultaneously.

* * * * *